US012494587B1

(12) United States Patent
Omar et al.

(10) Patent No.: US 12,494,587 B1
(45) Date of Patent: Dec. 9, 2025

(54) OPTICALLY TRANSPARENT MICROWAVE ABSORBER FOR STEALTH APPLICATIONS

(71) Applicant: KING FAHD UNIVERSITY OF PETROLEUM AND MINERALS, Dhahran (SA)

(72) Inventors: Ahmed Abdelmottaleb Abdelfattah Attia Omar, Dhahran (SA); Ahmed Hosameldin Khadrawy, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/210,040

(22) Filed: May 16, 2025

(51) Int. Cl.
*H01Q 17/00* (2006.01)
*H01Q 1/12* (2006.01)

(52) U.S. Cl.
CPC ......... *H01Q 17/008* (2013.01); *H01Q 1/1271* (2013.01)

(58) Field of Classification Search
None
See application file for complete search history.

(56) References Cited

U.S. PATENT DOCUMENTS

2022/0046836 A1 2/2022 Guo et al.
2023/0106637 A1 4/2023 Fang et al.

FOREIGN PATENT DOCUMENTS

CN 107069235 A 8/2017
CN 112867381 A * 5/2021 ........... H05K 9/0088
CN 217009568 U 7/2022

OTHER PUBLICATIONS

Senteng Lai, et al., "An Optically Transparent Ultrabroadband Microwave Absorber", IEEE Photonic Journal, vol. 9, Issue 6, Dec. 2017, 11 Pages.
Jiangshan Zheng, et al., "Transparent broadband absorber based on a multilayer ITQ conductive film", Optics Express, vol. 31, No. 3, Jan. 17, 2023. pp. 3731-3742, 12 Pages.

* cited by examiner

*Primary Examiner* — Whitney Moore
(74) *Attorney, Agent, or Firm* — Oblon, McClelland, Maier & Neustadt, L.L.P.

(57) ABSTRACT

A transparent wideband microwave absorber unit cell, a transparent wideband microwave absorber and a method of forming a transparent wideband microwave absorber, include a metal substrate, a first layer of glass attached to the metal substrate and having a first pattern of indium tin oxide (ITO) configured as a square loop centered about a central vertical axis and a second pattern of ITO including four equidistant square patches, a second layer of glass attached to the first layer of glass and having a third pattern of ITO configured as a dipole having a cross shape with a center axis coaxial with the central vertical axis, and a third layer of glass attached to the second layer of glass and having a fourth pattern of ITO configured as five circular patches, with a first circular patch located coaxially with the central vertical axis and four equidistant circular patches.

16 Claims, 14 Drawing Sheets

4/14

OPTICALLY TRANSPARENT MICROWAVE ABSORBER FOR STEALTH APPLICATIONS

STATEMENT REGARDING PRIOR DISCLOSURE BY THE INVENTORS

Aspects of this technology are described in an article "Transparent Low-Profile and Wideband ITO-Glass Microwave Absorber" published in IEEE Open Journal Of Antennas And Propagation, Vol. 6, No. 1, on Oct. 7, 2024, which is incorporated herein by reference in its entirety.

STATEMENT OF ACKNOWLEDGEMENT

Support provided by the King Fahd University of Petroleum and Minerals (KFUPM), Dhahran, Saudi Arabia through Project No. EC221005 is gratefully acknowledged.

BACKGROUND

Technical Field

The present disclosure is directed to microwave absorbers for stealth applications, and more particularly to optically transparent wideband microwave absorbers that provide simultaneous optical transparency and microwave absorption.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Microwave absorbers are periodic structures employed to absorb electromagnetic waves instead of reflecting or transmitting them. Traditional microwave absorbers have been widely adopted in various applications including military uses, radar cross-section reduction, anechoic chambers, and ensuring electromagnetic compatibility. In microwave absorber design, a primary challenge is achieving wide absorption bandwidth while maintaining a low profile structure. This requires carefully balancing impedance of the absorber with free space impedance to maximize absorption across a broad frequency range.

Various types of microwave absorbers have been reported in the literature including Dallenbach screens, Salisbury screens, Jaumann absorbers, and Circuit Analog (CA) absorbers. However, these conventional absorbers are optically opaque, which significantly limits their application in scenarios requiring both microwave absorption and optical transparency such as aircraft cabin windows, warship aperture glass, systems for radio-frequency identification, and transparent electronic windows for monitoring and protection.

Microwave absorbing materials that are optically transparent can transform electromagnetic energy into heat while also allowing optical radiation to pass through. These materials have garnered increasing interest for applications in civilian safety, military stealth technology, and camera imaging systems. The development of transparent microwave absorbers has evolved from single-layer to multi-layer structures, and has progressed from single-frequency operation to multi-frequency and wideband designs.

Several materials and approaches have been explored to develop microwave absorbing materials that exhibit optical transparency. These approaches typically incorporate transparent conductive materials selected from the group consisting of indium tin oxide (ITO), graphene and the like, in combination with transparent substrates such as glass or polyethylene terephthalate (PET). The evolution of these transparent absorbers has progressed from simple single-layer structures to more complex multi-layer configurations, expanding from single-frequency operation to multi-frequency and wideband designs. Some designs have utilized patterned transparent conductive films to create resonant structures that enhance absorption capabilities while maintaining optical transparency. These materials transform electromagnetic energy into heat while permitting optical radiation to pass through, making them valuable for various safety, stealth, and imaging applications.

CN217009568U describes an ultrawide band multilayer electromagnetic structure wave absorber based on a transparent medium material, comprising a glass protection layer and an ITO conductive glass layer. The absorber has a substrate layer covered with ITO, a layer above the substrate which has large patches spaced apart and a square ring which connects the patches, and a layer which has a periodic arrangement of Jerusalem cross-shaped frequency selection units. This design does not include a third etched pattern configured as five circular patches and achieves a limited fractional bandwidth of only about 94.67%.

CN107069235A describes a dual-layer structured broadband transparent wave-absorbing material comprising a glass substrate and an oxidized indium-tin thin film attached to the glass substrate. The glass substrate adopts upper and lower dual-layer transparent glass plates with a layer of oxidized indium-tin thin film etched on the upper surface of each layer. However, the structure of the layers is very different from the layers of the present disclosure and provides inferior bandwidth performance.

US20220046836A1 describes a transparent electromagnetic interference (EMI) shielding device used as a microwave absorber. The device structure comprises a monolayer of graphene, an ultrathin Ag alloy comprising copper surrounded by two indium tin oxide layers, and a fused silica layer. This reference does not utilize a glass substrate for optical transparency purposes, instead employing PET, Ag, and Cu materials.

US20230106637A1 describes a broadband near infrared absorber including a top cross-shaped gold layer, an ITO thin film, a $SiO_2$ layer and a bottom hollowed-out cross-shaped gold layer arranged from top to bottom. However, this reference has a significantly narrower operational bandwidth compared to the present disclosure.

Each of the aforementioned references suffers from one or more drawbacks hindering their adoption, such as limited absorption bandwidth, insufficient optical transparency, complex fabrication processes, or thickness constraints.

Accordingly, it is one object of the present disclosure to provide a transparent wideband microwave absorber that achieves both high microwave absorption across a wide frequency range and optimal optical transparency, while maintaining a low-profile structure suitable for practical applications in stealth technology.

SUMMARY

In an exemplary embodiment, a transparent wideband microwave absorber unit cell is described, comprising: a metal substrate; a first layer of glass attached to the metal substrate, wherein the first layer of glass has a top surface configured with a first pattern of indium tin oxide (ITO) and a second pattern of ITO, wherein the first pattern is configured as a square loop centered about a central vertical axis of the transparent wideband microwave absorber unit cell and the second pattern includes four equidistant square patches, wherein the four equidistant square patches are evenly spaced on the top surface of the first layer of glass between the square loop and the central vertical axis; a second layer of glass attached to the first layer of glass, wherein the second layer of glass includes a top surface having a third pattern of ITO, wherein the third pattern is configured as a dipole having a cross shape, wherein a center axis of the cross shape is coaxial with the central vertical axis; and a third layer of glass attached to the second layer of glass, wherein the third layer of glass includes a top surface having a fourth pattern of ITO, wherein the fourth pattern is configured as five circular patches, wherein a first circular patch is located coaxially with the central vertical axis and four equidistant circular patches are evenly spaced between the square loop and the central vertical axis.

In another exemplary embodiment, a transparent wideband microwave absorber is described, comprising: a plurality of unit cells formed on a common metal substrate, wherein each unit cell includes: a first layer of glass attached to the common metal substrate, wherein the first layer of glass has a top surface configured with a first pattern of indium tin oxide (ITO) and a second pattern of ITO, wherein the first pattern is configured as a square loop centered about a central vertical axis of the transparent wideband microwave absorber unit cell and the second pattern includes four equidistant square patches, wherein the four equidistant square patches are evenly spaced on the top surface of the first layer of glass between the square loop and the central vertical axis; a second layer of glass attached to the first layer of glass, wherein the second layer of glass includes a top surface having a third pattern of ITO, wherein the third pattern is configured as a dipole having a cross shape, wherein a center axis of the cross shape is coaxial with the central vertical axis; and a third layer of glass attached to the second layer of glass, wherein the third layer of glass includes a top surface having a fourth pattern of ITO, wherein the fourth pattern is configured as five circular patches, wherein a first circular patch is located coaxially with the central vertical axis and four equidistant circular patches are evenly spaced between the square loop and the central vertical axis.

In yet another exemplary embodiment, a method of forming a transparent wideband microwave absorber unit cell is described, comprising: forming a metal substrate; attaching a first layer of glass to the metal substrate: printing a layer indium tin oxide (ITO) ink on a top surface of the first layer of glass, and etching the ITO ink to form a first pattern and a second pattern, wherein the first pattern is configured as a square loop centered about a central vertical axis of the transparent wideband microwave absorber unit cell and the second pattern includes four equidistant square patches, wherein the four equidistant square patches are evenly spaced on the top surface of the first layer of glass between the square loop and the central vertical axis; attaching, with an optical adhesive, a second layer of glass to the first layer of glass; printing a layer indium tin oxide (ITO) ink on a top surface of the second layer of glass, and etching the ITO ink to form a third pattern, wherein the third pattern is configured as a dipole having a cross shape, wherein a center axis of the cross shape is coaxial with the central vertical axis; attaching, with an optical adhesive, a third layer of glass to the second layer of glass; printing a layer indium tin oxide (ITO) ink on a top surface of the third layer of glass; and etching the ITO ink to form a fourth pattern on a top surface of the third layer of glass, wherein the fourth pattern is configured as five circular patches, wherein a first circular patch is located coaxially with the central vertical axis and four equidistant circular patches are evenly spaced between the square loop and the central vertical axis.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
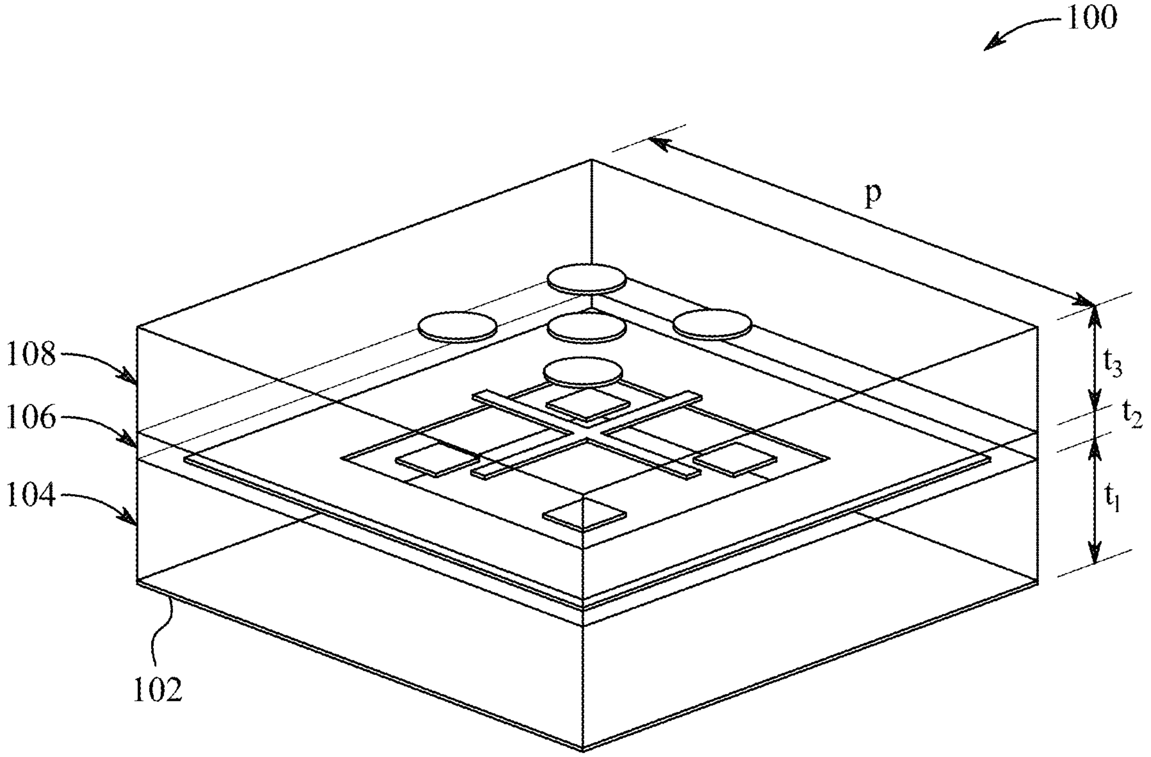
FIG. 1A is a perspective view of a transparent wideband microwave absorber unit cell, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a transparent wideband microwave absorber unit cell, a transparent wideband microwave absorber that incorporates multiple unit cells, and a method of forming the transparent wideband microwave absorber unit cell. The transparent wideband microwave absorber provides a combination of optical transparency and wideband microwave absorption capabilities, making it suitable for various applications where both visual clarity and electromagnetic absorption are required. The transparent wideband microwave absorber achieves wide absorption bandwidth by utilizing a structure that includes multiple layers of glass with specific patterns of indium tin oxide (ITO) applied to each layer. The layered structure creates a gradual impedance matching between free space and the transparent wideband microwave absorber, enabling effective absorption across a broad frequency range. The transparent wideband microwave absorber of the present disclosure maintains a low profile through the use of high dielectric constant materials, specifically glass with a relative permittivity of about 5.5, which reduces the physical dimensions required for effective absorption. The transparent wideband microwave absorber addresses limitations found in conventional absorbers, providing a solution that combines wideband absorption, low profile design, and optical transparency for stealth and electromagnetic compatibility applications.

Referring to FIG. 1A, illustrated is a perspective view of a transparent wideband microwave absorber unit cell (as represented by reference numeral 100, also referred to as "unit cell 100"). The transparent wideband microwave absorber unit cell 100 has a layered structure designed to provide both optical transparency and microwave absorption across a wide frequency range. As illustrated, the transparent wideband microwave absorber unit cell 100 includes a metal substrate 102, a first layer of glass 104 attached to the metal substrate 102, a second layer of glass 106 attached to the first layer of glass 104, and a third layer of glass 108 attached to the second layer of glass 106. Each layer of glass 104, 106, 108 has specific patterns of indium tin oxide (ITO) applied to its top surface, creating a structure that absorbs microwave energy while allowing visible light to pass through. The transparent wideband microwave absorber unit cell 100 generally has a square or rectangular profile when viewed from above, with the patterns of ITO on each layer arranged symmetrically around a central vertical axis that passes through the center thereof. In a non-limiting example, p=15.6 mm, layer thicknesses $t_1$=3.2 mm, $t_2$=0.7 mm, $t_3$=2.8 mm (as shown in FIG. 1A). The arrangement of the layers and the specific patterns of ITO create a structure that effectively matches the impedance of free space to the impedance of the transparent wideband microwave absorber unit cell 100 across a wide frequency range, enabling efficient absorption of microwave energy.

Figure 1B:
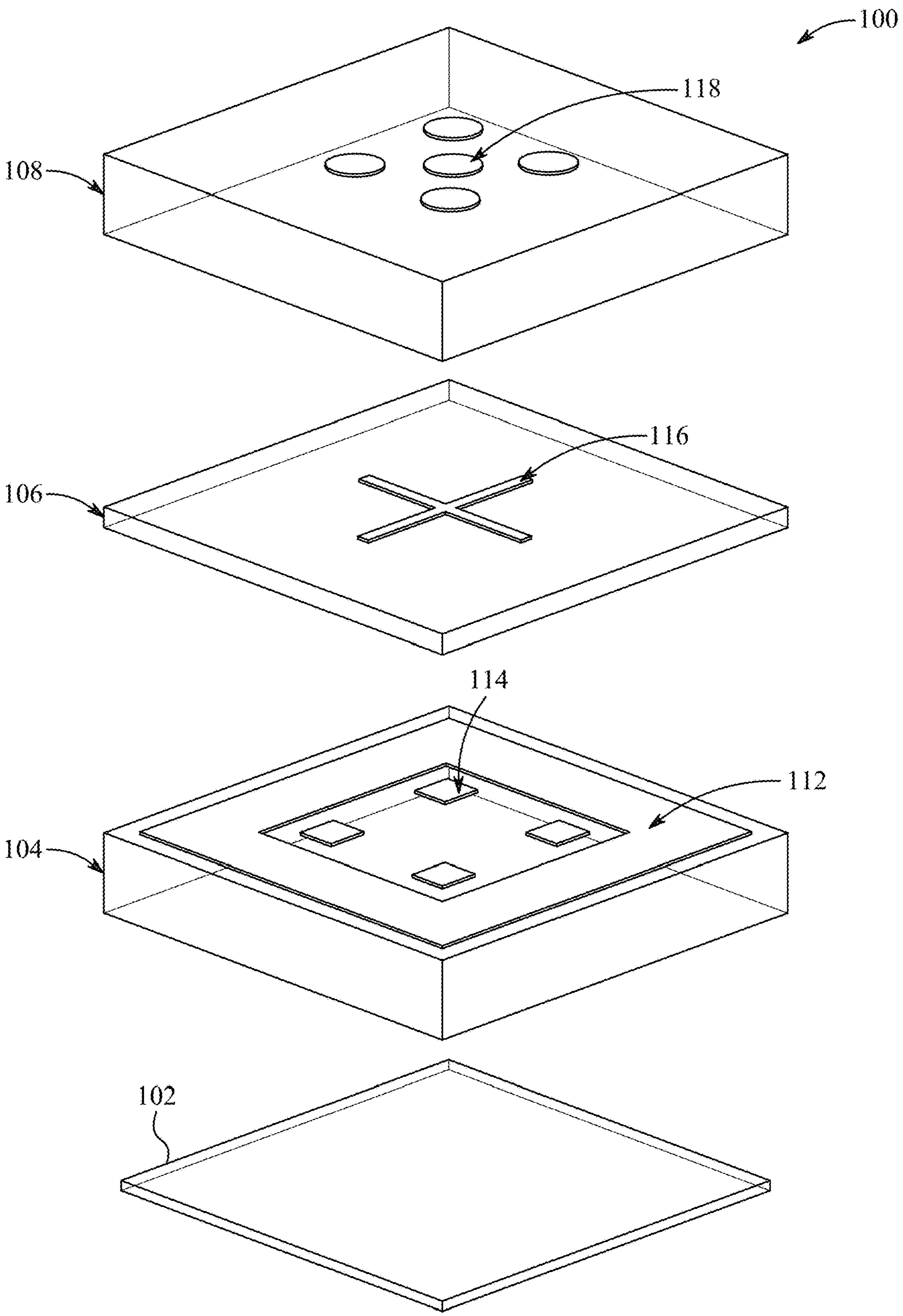
FIG. 1B is an exploded perspective view of the transparent wideband microwave absorber unit cell of FIG. 1A, according to certain embodiments.

Referring to FIG. 1B, illustrated is an exploded perspective view of the transparent wideband microwave absorber unit cell 100, showing the individual components separated to reveal their structural details. The metal substrate 102 forms the base of the transparent wideband microwave absorber unit cell 100 and functions as a ground plane that prevents transmission of electromagnetic waves therethrough, ensuring that incident microwave energy is either reflected or absorbed by the structure. The first layer of glass 104 is positioned directly above the metal substrate 102 and includes a first pattern of ITO 112 configured as a square loop centered about the central vertical axis, and a second pattern of ITO 114 configured as four equidistant square patches located between the square loop and the central vertical axis. The second layer of glass 106 is positioned above the first layer of glass 104 and includes a third pattern of ITO 116 configured as a dipole with a cross shape centered on the central vertical axis. The third layer of glass 108 is positioned at the top of the structure and includes a fourth pattern of ITO 118 configured as five circular patches, with a first circular patch located at the central vertical axis and four equidistant circular patches positioned between the central patch and the outer edges of the layer. The exploded view reveals how the different patterns of ITO on each layer interact to create the overall absorption properties of the transparent wideband microwave absorber unit cell 100.

Figure 2A:
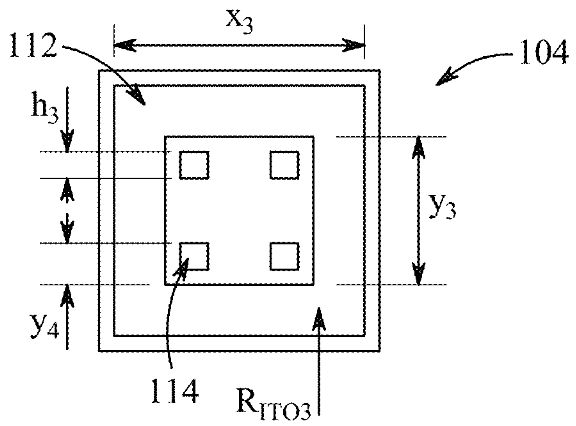
FIG. 2A is a top view of a first layer of glass of the transparent wideband microwave absorber unit cell showing a square loop and four equidistant square patches of indium tin oxide, according to certain embodiments.

Referring to FIG. 2A, illustrated is a top view of the first layer of glass 104 of the transparent wideband microwave absorber unit cell 100. The first layer of glass 104 includes the first pattern of ITO 112 and the second pattern of ITO 114 applied to its top surface. The first pattern of ITO 112 is configured as the square loop centered about the central vertical axis of the transparent wideband microwave absorber unit cell 100. In an aspect of the present disclosure, the square loop has an outer width $x_3$ of about 14 mm, an inner width $y_3$ of about 8.4 mm, and a thickness $t_1$ of about 2.8 mm. Further, the second pattern of ITO 114 includes the four equidistant square patches, each having a width $h_3$ of about 1.5 mm. The four equidistant square patches are evenly spaced on the top surface of the first layer of glass 104 between the square loop and the central vertical axis, with each patch spaced from an inner edge of the square loop by about 0.9 mm. In a non-limiting example, $x_3$=14 mm, $y_3$=8.4 mm, $h_3$=1.5 mm, $y_4$=2.4 mm, $R_{ITO3}$=54 $\Omega/mm^2$ (ohms per square) for the first layer of glass 104 (as shown in FIG. 2A). The specific dimensions and positioning of the patterns on the first layer of glass 104 contribute to the resonant behavior of the transparent wideband microwave absorber unit cell 100 at specific frequencies within the operating band.

Figure 2B:
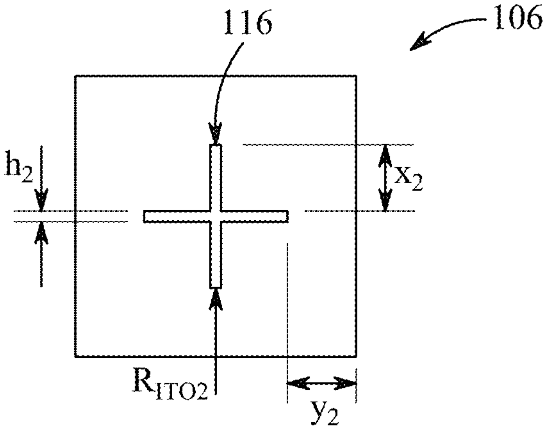
FIG. 2B is a top view of a second layer of glass of the transparent wideband microwave absorber unit cell showing a cross dipole pattern of indium tin oxide, according to certain embodiments.

Referring to FIG. 2B, illustrated is a top view of the second layer of glass 106 of the transparent wideband microwave absorber unit cell 100. The second layer of glass 106 includes the third pattern of ITO 116 applied to its top surface. The third pattern of ITO 116 is configured as a dipole having the cross shape, with a center axis of the cross shape aligned coaxially with the central vertical axis. In an aspect of the present disclosure, the cross shape has perpendicular arms, each with a length $x_2$ of about 8 mm and a width $h_2$ of about 0.5 mm. Each arm has an end located about 3.5 mm from an outer edge of the second layer of glass 106. In a non-limiting example, $x_2$=4 mm, $y_2$=3.5 mm, $h_2$=0.5 mm, $R_{ITO2}$=7 Ω/mm$^2$ for the second layer of glass 106 (as shown in FIG. 2B). The cross-shaped dipole pattern is designed to resonate at specific frequencies within the operating band of the transparent wideband microwave absorber unit cell 100, complementing the resonant characteristics of the patterns on the other layers to provide wideband absorption capabilities.

Figure 2C:
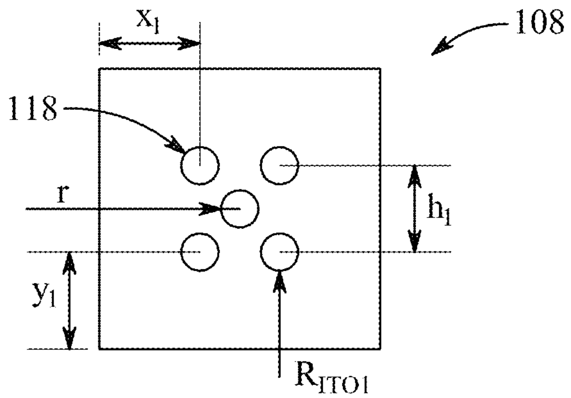
FIG. 2C is a top view of a third layer of glass of the transparent wideband microwave absorber unit cell showing five circular patches of indium tin oxide, according to certain embodiments.

Referring to FIG. 2C, illustrated is a top view of the third layer of glass 108 of the transparent wideband microwave absorber unit cell 100. The third layer of glass 108 includes the fourth pattern of ITO 118 applied to its top surface. The fourth pattern of ITO 118 is configured as the five circular patches, with one of the circular patches located coaxially with the central vertical axis and four equidistant circular patches evenly spaced between the square loop pattern of the first layer of glass 104 and the central vertical axis. In an aspect of the present disclosure, the four equidistant circular patches are spaced at a center-to-center distance $h_1$ of about 4.4 mm from each other. Also, a center of each circular patch of the four equidistant circular patches is located at a distance $x_1$ of about 5.6 mm from an outer edge of the third layer of glass 108. Further, each of the circular patches has a radius of about 1 mm. In a non-limiting example, $x_1$=5.6 mm, $y_1$=5.6 mm, $h_1$=4.4 mm, r=1 mm, $R_{ITO1}$=10 Ω/mm$^2$ for the third layer of glass 108 (as shown in FIG. 2C). The circular patch pattern on the third layer of glass 108 contributes to the overall impedance matching of the transparent wideband microwave absorber unit cell 100 and adds additional resonant frequencies to the operating band.

In one aspect of the present disclosure, the metal substrate 102 is made of copper and has a thickness of about 35 μm. The copper material provides good electrical conductivity, creating an effective ground plane for the transparent wideband microwave absorber unit cell 100. The proposed thickness is sufficient to prevent transmission of electromagnetic waves while maintaining a low overall profile for the transparent wideband microwave absorber unit cell 100. The copper ground plane contributes to the absorption mechanism by creating a terminated transmission line effect, where incident waves travel through the glass layers, reflect off the ground plane, and interact with the incident waves to create destructive interference under specific conditions. In another aspect of the present disclosure, the metal substrate 102 is indium tin phosphate configured to have a resistivity of about one ohm per square mm. The use of indium tin phosphate as the ground plane material allows for some degree of optical transparency in the ground plane, potentially increasing the overall optical transparency of the transparent wideband microwave absorber unit cell 100. With the indium tin phosphate ground plane, the absorption performance remains comparable to that of the copper ground plane, as both materials provide sufficient electrical conductivity to function as an effective ground plane for the transparent wideband microwave absorber unit cell 100. The choice between copper and indium tin phosphate as the ground plane material depends on specific application requirements, particularly the degree of optical transparency required and the cost considerations of the manufacturing process. The simulated $S_{11}$ versus frequency response for the copper and indium tin phosphate ground planes is shown in FIG. 6D.

In an aspect of the present disclosure, the first layer of glass 104 has a thickness $t_1$ of about 3.2 mm, the second layer of glass 106 has a thickness $t_2$ of about 0.7 mm and the third layer of glass 108 has a thickness $t_3$ of about 2.8 mm. The specific thicknesses of each glass layer are selected to optimize the electromagnetic behavior of the transparent wideband microwave absorber unit cell 100 across the operating frequency band. Herein, the combined thickness of all three glass layers 104, 106, 108 totals to about 6.7 mm. The first layer of glass 104 provides a substantial portion of the dielectric loading, while the second layer of glass 106 is significantly thinner, creating a variation in the layer thickness that contributes to the broadband absorption capabilities. The third layer of glass 108 forms the top layer of the transparent wideband microwave absorber unit cell 100 and directly interfaces with free space.

In an aspect of the present disclosure, each layer of glass 104, 106, 108 has a relative permittivity of about 5.5. The relative permittivity, also known as the dielectric constant, characterizes the ability of the material to store electrical energy in an electric field. The high relative permittivity of the glass material contributes to the low profile of the transparent wideband microwave absorber unit cell 100 by reducing the physical thickness required for effective absorption. In a dielectric material with relative permittivity Er, the wavelength 2*a* is related to the free-space wavelength $\lambda_0$ by the equation $\lambda_d=\lambda_0/\sqrt{\varepsilon_r}$. With a relative permittivity of 5.5, the wavelength within the glass material is reduced by a factor of approximately 2.35 compared to free space, allowing for a corresponding reduction in the physical thickness of the transparent wideband microwave absorber unit cell 100.

In an aspect of the present disclosure, a structure thickness of each unit cell 100 is given by 0.077 $\lambda_{min}$, where $\lambda_{min}$ is a free-space wavelength of about 3.48 GHz. The combined thickness of all three glass layers 104, 106, 108, totaling about 6.7 mm, creates a structure with a physical thickness of approximately 0.077 $\lambda_{min}$, where $\lambda_{min}$ is the free-space wavelength at the lowest operating frequency of about 3.48 GHz. At the lowest operating frequency of 3.48 GHz, the free-space wavelength $\lambda_{min}$ is approximately 8.67 cm, making the structure thickness of the transparent wideband microwave absorber unit cell 100 about 6.7 mm (0.077 $\lambda_{min}$). This thin profile is achieved through the use of high dielectric constant materials, specifically glass with a relative permittivity of about 5.5, which allows for a reduction in the physical thickness required for effective absorption. The structure thickness includes the combined thickness of all three glass layers (3.2 mm+0.7 mm+2.8 mm=6.7 mm), as well as the thickness of the ITO patterns (approximately 350 nm each) and the metal substrate, though the latter contributes minimally to the overall thickness.

In an aspect of the present disclosure, each etch pattern of ITO 112, 114, 116, 118 has a thickness of about 350 nm. Such thickness is selected to balance the trade-off between electrical conductivity and optical transparency, with thinner films generally providing better transparency but lower conductivity. At a thickness of about 350 nm, the ITO patterns maintain sufficient optical transparency to permit visibility through the transparent wideband microwave absorber unit cell 100 while providing adequate electrical conductivity for interaction with microwave frequencies. The thickness of about 350 nm ensures that the ITO patterns can create the necessary surface impedance for effective absorption of incident electromagnetic waves, converting the energy of these waves into heat through resistive losses in the ITO material.

In an aspect of the present disclosure, each unit cell 100 is configured to resonate in a frequency band of about 3.48 GHz to about 13.02 GHz. The resonant behavior across this wide frequency range is achieved through the combination of multiple resonant structures created by the different ITO patterns on each glass layer. Each ITO pattern contributes resonant behavior at specific frequencies within the overall operating band, with the combination of these resonances creating a continuous absorption band that spans from 3.48 GHz to 13.02 GHz. The lowest frequency of 3.48 GHz corresponds to the longest wavelength that the transparent wideband microwave absorber unit cell 100 can effectively absorb, determined primarily by the overall dimensions of the unit cell and the largest features of the ITO patterns, particularly the square loop on the first layer of glass 104. The upper frequency limit of 13.02 GHz is influenced primarily by the smaller features of the ITO patterns, particularly the circular patches on the third layer of glass 108.

In an aspect of the present disclosure, a fractional bandwidth of each unit cell 100 is about 115.64%. The fractional bandwidth is calculated as the ratio of the bandwidth to the center frequency, expressed as a percentage. For the transparent wideband microwave absorber unit cell 100, with a frequency range of 3.48 GHz to 13.02 GHZ, the bandwidth is about 9.54 GHz and the center frequency is about 8.25 GHz, resulting in a fractional bandwidth of about 115.64%. This high fractional bandwidth indicates the wideband nature of the transparent wideband microwave absorber unit cell 100, with effective absorption maintained across a frequency range that spans more than an octave. The high fractional bandwidth is achieved through the specific design of the transparent wideband microwave absorber unit cell 100, which creates multiple overlapping resonances across the operating frequency band, with each ITO pattern on the glass layers contributing resonant behavior at specific frequencies.

In an aspect of the present disclosure, a resistance of the first layer of glass 104 configured with the first pattern of ITO 112 and the second pattern of ITO 114 is about 54 $\Omega/mm^2$, a resistance of the second layer of glass 106 configured with the third pattern of ITO 116 is about 7 $\Omega/mm^2$, and a resistance of the third layer of glass 108 configured with the fourth pattern of ITO 118 is about 10 $\Omega/mm^2$. These specific resistance values are selected to optimize the absorption performance of the transparent wideband microwave absorber unit cell 100 across the operating frequency band. The variation in resistance between the layers creates a specific impedance profile within the transparent wideband microwave absorber unit cell 100, contributing to the wideband absorption capabilities. The relatively high resistance of the first layer of glass 104 (54 $\Omega/mm^2$) primarily addresses the lower frequencies within the operating band, while the lower resistances of the second layer of glass 106 (7 $\Omega/mm^2$) and the third layer of glass 108 (10 $\Omega/mm^2$) are more effective at higher frequencies.

In an aspect of the present disclosure, an absolute value of an $S_{11}$ reflection coefficient is between about −10 dB to about −15 dB at normal incidence of an impinging microwave beam. The $S_{11}$ reflection coefficient, also known as the return loss, is a measure of how much power is reflected from the transparent wideband microwave absorber unit cell 100 compared to the incident power. A reflection coefficient of −10 dB corresponds to approximately 90% absorption, while a reflection coefficient of −15 dB corresponds to approximately 97% absorption. The transparent wideband microwave absorber unit cell 100 maintains the reflection coefficient between these values across the operating frequency band of 3.48 GHz to 13.02 GHz, facilitating high absorption efficiency for incident microwave energy. The reflection coefficient between the said values is achieved through the specific design of the transparent wideband microwave absorber unit cell 100, which creates a gradual impedance matching between free space and the absorber structure.

Figure 3:
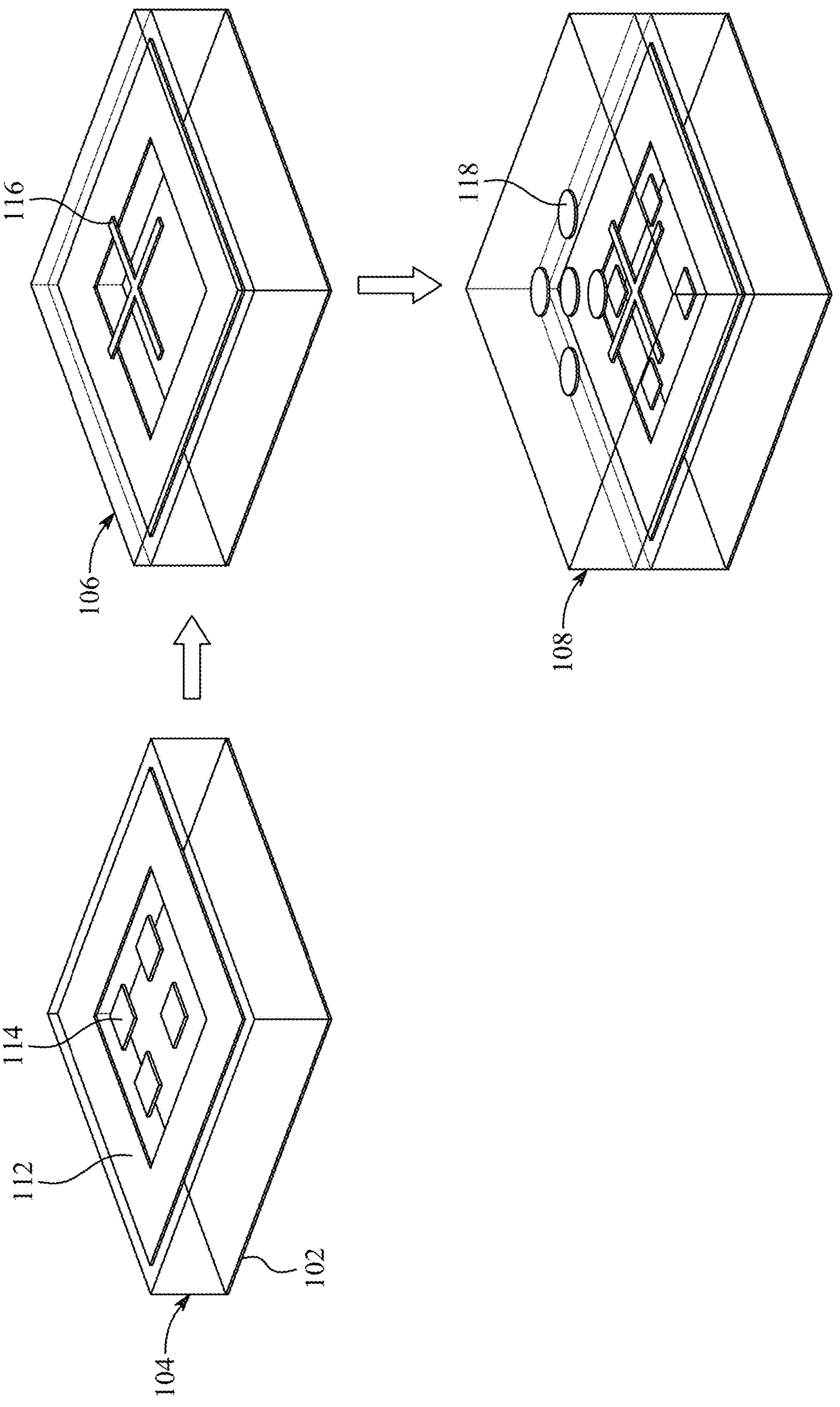
FIG. 3 is a process flow diagram illustrating stages for manufacturing the transparent wideband microwave absorber unit cell, according to certain embodiments.

Referring now to FIG. 3, illustrated is a process flow diagram showing the manufacturing steps for producing the transparent wideband microwave absorber unit cell 100. The manufacturing process begins with providing the metal substrate 102, which involves preparing the base layer that will function as the ground plane for the absorber; attaching the first layer of glass 104 to the metal substrate 102 using an optical adhesive (not shown); and followed by printing the first pattern of ITO 112 and the second pattern of ITO 114 on the top surface of the first layer of glass 104. The second layer of glass 106 is then attached to the first layer of glass 104 using the optical adhesive, and the third pattern of ITO 116 is printed on the top surface of the second layer of glass 106. Further, the third layer of glass 108 is attached to the second layer of glass 106 using the optical adhesive, and finally, the fourth pattern of ITO 118 is printed on the top surface of the third layer of glass 108. The completion of the fourth pattern of ITO 118 finalizes the structure of the transparent wideband microwave absorber unit cell 100, creating a complete absorber with specific electromagnetic and optical properties for the target applications.

The optical adhesive, as used in these manufacturing stages, is a specialized polymer material with high optical clarity and good adhesion to both glass and metal surfaces, providing strong mechanical bonding while maintaining transparency. The employed attachment processes involves applying a thin, uniform layer of the optical adhesive to the substrate (layer), positioning the next layer on top, and then curing the optical adhesive according to its specific requirements (e.g., UV exposure, heat treatment, or time-dependent curing). The printing processes in these manufacturing stages can be achieved through screen printing or photolithography, creating patterns of ITO with specific dimensions and resistivity. The ITO ink used in the printing process is a formulation containing indium oxide and tin oxide particles suspended in a suitable solvent, configured to create a conductive film with the desired resistivity when properly cured.

Figure 4:
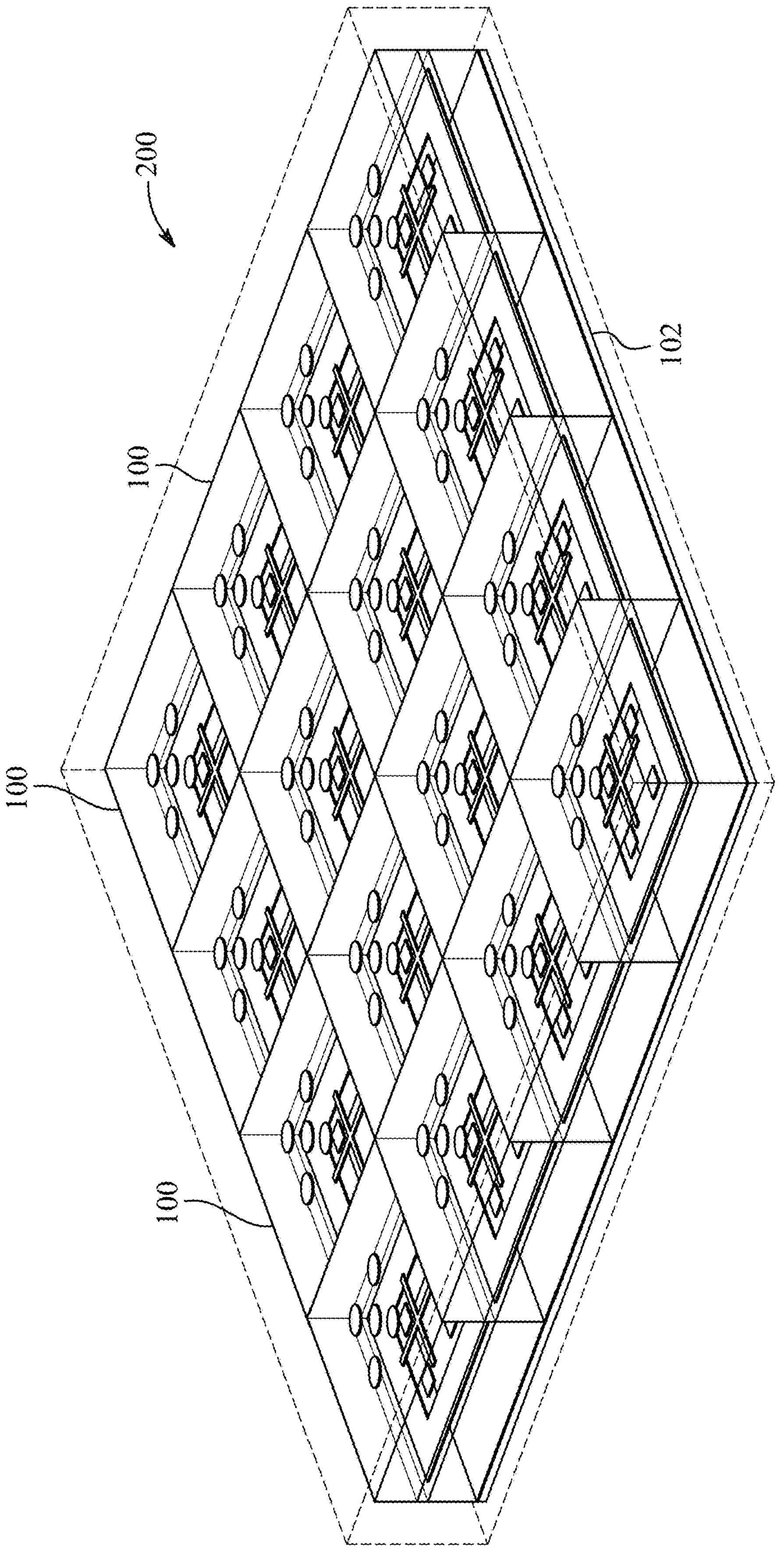
FIG. 4 is a diagrammatic view of a transparent wideband microwave absorber comprising a plurality of unit cells, according to certain embodiments.

Referring to FIG. 4, illustrated is a diagrammatic view of a transparent wideband microwave absorber (as referred by reference numeral 200). The transparent wideband microwave absorber 200 comprises the plurality of unit cells 100 formed on a common metal substrate 202. The plurality of unit cells 100 are arranged in a grid pattern, with each unit cell 100 having the same structure as described above. The common metal substrate 202 provides a continuous ground plane for all unit cells 100, ensuring consistent performance across the entire transparent wideband microwave absorber 200. Each unit cell 100 includes the first layer of glass 104, the second layer of glass 106, and the third layer of glass 108, with their respective ITO patterns 112, 114, 116, 118 as described earlier. The unit cells 100 are connected to form a continuous structure, with the ITO patterns on each layer aligned to create the specified geometric configurations of square loop, square patches, cross-shaped dipole, and circular patches.

The transparent wideband microwave absorber 200 maintains the same electromagnetic and optical properties as the individual unit cells 100, including the wideband absorption across frequencies from 3.48 GHz to 13.02 GHz, the low profile with a structure thickness of 0.077 $\lambda_{min}$, and the optical transparency through the glass layers with their ITO patterns. The manufacturing process for the transparent wideband microwave absorber 200 follows the same steps as described for the individual unit cells 100, but scaled up to create the larger structure with multiple unit cells arranged in the grid pattern on the common metal substrate 202. The transparent wideband microwave absorber 200 expands the capabilities of individual unit cells 100 by creating a larger absorber structure suitable for practical applications. The arrangement of multiple unit cells 100 on the metal substrate 102 which is common to all of the unit cells, creates an absorber panel with dimensions that can cover significant areas, such as windows, walls, or display screens.

In an aspect of the present disclosure, the plurality of unit cells 100 is 169 unit cells. Herein, the plurality of unit cells 100 may be arranged in a 13×13 grid. The transparent wideband microwave absorber 200 is configured as a square having sides of 200 mm×200 mm and a height of about 6.7 mm. These dimensions of the transparent wideband microwave absorber 200 are suitable for practical applications, such as windows or display screens, while the given number and arrangement of unit cells 100 facilitate consistent performance across the entire absorber area. Specifically, the 13×13 grid arrangement creates a sufficient number of unit cells 100 to demonstrate the performance of the transparent wideband microwave absorber 200 in a practical configuration, while keeping the overall dimensions manageable for manufacturing and testing.

In an aspect of the present disclosure, for the transparent wideband microwave absorber 200, a fractional bandwidth is about 115.64% and a relative permittivity is about 6 in a frequency range of about 3.48 GHz to about 13.02 GHz. The transparent wideband microwave absorber 200 maintains the same high fractional bandwidth as the individual unit cells 100, absorbing electromagnetic waves across a wide frequency range. The relative permittivity of about 6 for the transparent wideband microwave absorber 200 refers to the effective dielectric constant of the entire structure, including the glass layers and the ITO patterns. It may be noted that this value is slightly higher than the relative permittivity of the glass material itself (which is about 5.5) due to the contribution of the ITO patterns, which have different electromagnetic properties than the glass.

Figure 5:
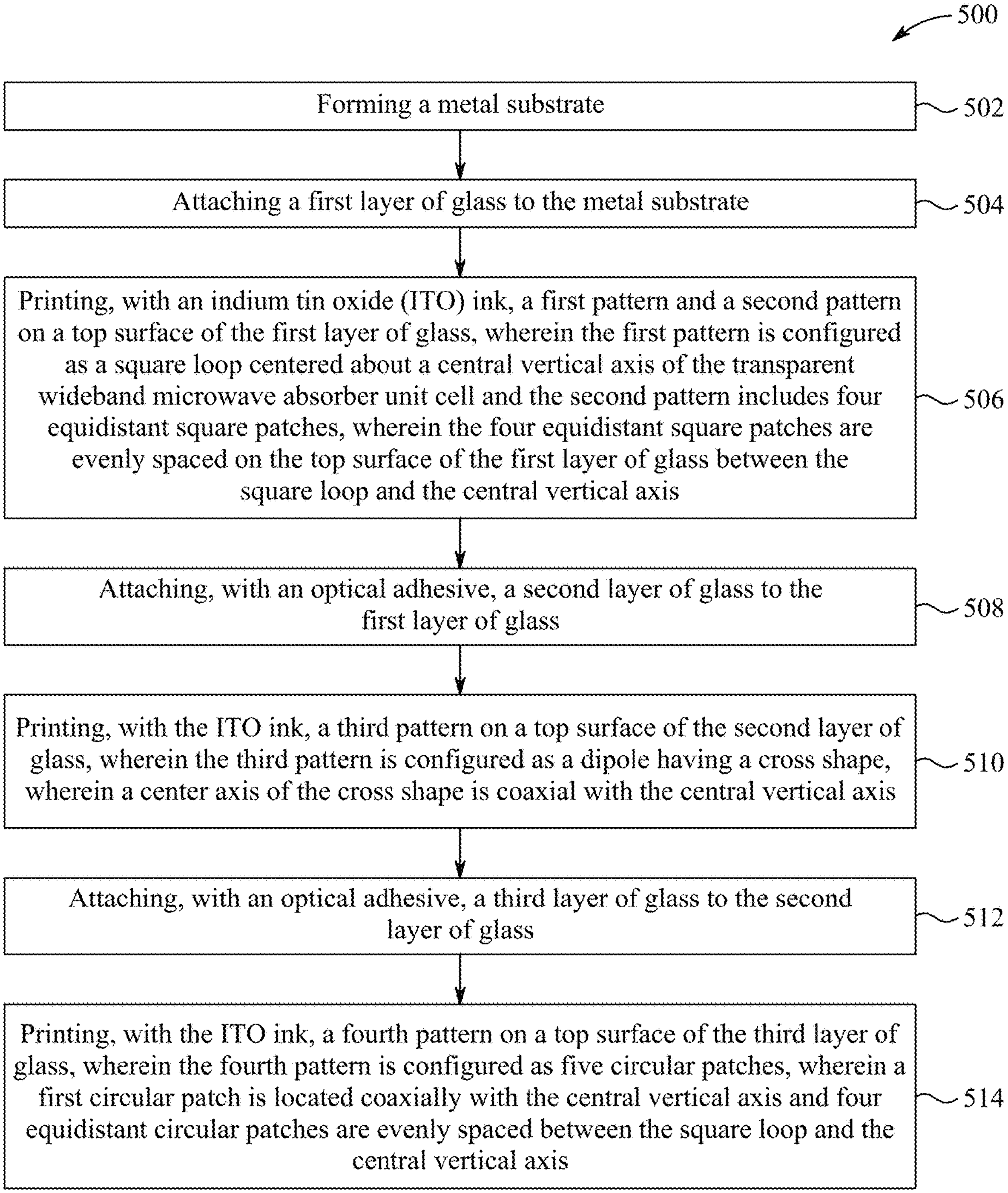
FIG. 5 is a flowchart listing steps involved in a method of forming the transparent wideband microwave absorber unit cell, according to certain embodiments.

Referring now to FIG. 5, illustrated is a flowchart of a method 500 of fabricating the transparent wideband microwave absorber unit cell 100. The method 500 provides a systematic approach to creating the layered structure with specific ITO patterns that provide the wideband absorption and optical transparency of the transparent wideband microwave absorber unit cell 100. The method 500 includes a series of steps. These steps are only illustrative, and other alternatives may be considered where one or more steps are added, one or more steps are removed, or one or more steps are provided in a different sequence without departing from the scope of the present disclosure. Various variants described above, with respect to the aforementioned transparent wideband microwave absorber unit cell 100 apply mutatis mutandis to the present method 500.

At step 502, the method 500 includes forming the metal substrate 102. This step involves preparing the base layer that will function as the ground plane for the transparent wideband microwave absorber unit cell 100. The metal substrate 102 formed in this step can be made of copper with a thickness of about 35 μm or indium tin phosphate with a resistivity of about one ohm per square mm, depending on the specific application requirements.

At step 504, the method 500 includes attaching the first layer of glass 104 to the metal substrate 102. This step creates the base structure for the transparent wideband microwave absorber unit cell 100, combining the metal substrate 102 with the first layer of glass 104. The attachment is achieved using the optical adhesive that provides mechanical bonding while maintaining transparency.

At step 506, the method 500 includes printing, with the indium tin oxide (ITO) ink, the first pattern 112 and the second pattern 114 on the top surface of the first layer of glass 104, and etching away the ITO ink to leave the first pattern 112, wherein the first pattern 112 is configured as the square loop centered about the central vertical axis of the transparent wideband microwave absorber unit cell 100 and the second pattern 114 includes the four equidistant square patches, wherein the four equidistant square patches are evenly spaced on the top surface of the first layer of glass 104 between the square loop and the central vertical axis. This step creates the first set of resonant structures for the transparent wideband microwave absorber unit cell 100, applying specific patterns of ITO to the top surface of the first layer of glass 104.

At step 508, the method 500 includes attaching, with the optical adhesive, the second layer of glass 106 to the first layer of glass 104. This step adds the second layer of glass 106 to the structure of the transparent wideband microwave absorber unit cell 100, creating a stacked arrangement that contributes to the wideband absorption capabilities.

At step 510, the method 500 includes printing, with the ITO ink, the third pattern 116 on the top surface of the second layer of glass 106 and etching the ITO ink to reveal the third pattern 116, wherein the third pattern 116 is configured as the dipole having the cross shape, wherein the center axis of the cross shape is coaxial with the central vertical axis. This step creates the third resonant structure for the transparent wideband microwave absorber unit cell 100, by applying the specific third pattern of ITO 116 to the top surface of the second layer of glass 106.

The ITO layers may be printed by an etching process in which an ITO layer is applied to the top surface of the respective glass layer. The ITO layer is etched to remove unwanted portions of the ITO from the glass surface, leaving only the respective pattern of ITO.

At step 512, the method 500 includes attaching, with the optical adhesive, the third layer of glass 108 to the second layer of glass 106. This step adds the final layer to the structure of the transparent wideband microwave absorber unit cell 100, completing the stacked arrangement that provides the wideband absorption capabilities.

At step 514, the method 500 includes printing, with the ITO ink, the fourth pattern 118 on the top surface of the third layer of glass 108, and etching the ITO ink, wherein the fourth pattern 118 is configured as the five circular patches, wherein the first circular patch is located coaxially with the central vertical axis and the four equidistant circular patches are evenly spaced between the square loop and the central vertical axis. This step creates the final set of resonant structures for the transparent wideband microwave absorber unit cell 100, applying the specific fourth pattern of ITO 118 to the top surface of the third layer of glass 108.

The method 500 further includes forming the transparent wideband microwave absorber 200 by forming the layers of the plurality of unit cells 100 onto a common substrate as a square grid having a structure thickness of about 6.7 mm and a width of about 200 mm. This process expands the capabilities of individual unit cells 100 by creating a larger absorber structure suitable for practical applications. The method 500 further includes exhibiting, by the transparent wideband microwave absorber 200, under interrogation by a microwave beam at normal incidence, a fractional bandwidth of about 115.6% covering a frequency band in a range from about 3.48 GHz to about 13.02 GHz. This characteristic demonstrates the wideband absorption capabilities of the transparent wideband microwave absorber 200 created through the method 500. The high fractional bandwidth indicates that the absorber effectively absorbs electromagnetic waves across a frequency range that spans more than an octave, from 3.48 GHz to 13.02 GHz. This wide operating band covers portions of the S-band, C-band, X-band, and Ku-band, making the absorber suitable for various applications where protection against electromagnetic interference or radar detection across multiple frequency bands is required.

Figure 6A:
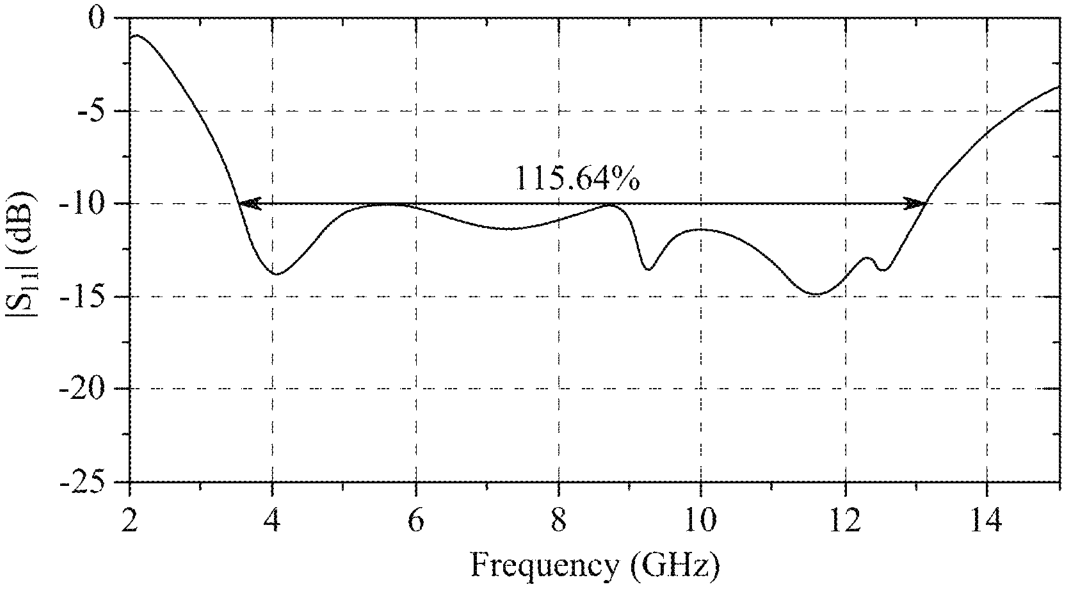
FIG. 6A is a graph for simulated reflection coefficient of the transparent wideband microwave absorber unit cell at normal incidence, according to certain embodiments.

Referring to FIG. 6A, illustrated is a graph showing the simulated reflection coefficient of the transparent wideband microwave absorber unit cell 100 at normal incidence. The graph plots the reflection coefficient ($S_{11}$ parameter) in decibels (dB) against frequency in gigahertz (GHz). The simulation parameters include a unit cell size p=15.6 mm, layer thicknesses $t_1$=3.2 mm, $t_2$=0.7 mm, $t_3$=2.8 mm, and specific dimensions for the ITO patterns: $x_1$=5.6 mm, $y_1$=5.6 mm, $h_1$=4.4 mm, r=1 mm, $R_{ITO1}$=10 Ω/mm$^2$ for the third layer; $x_2$=4 mm, $y_2$=3.5 mm, $h_2$=0.5 mm, $R_{ITO2}$=7 Ω/mm$^2$ for the second layer; $x_3$=14 mm, $y_3$=8.4 mm, $h_3$=1.5 mm, $y_4$=2.4 mm, $R_{ITO3}$=54 Ω/mm$^2$ for the first layer; and glass material with $\varepsilon_r$=5.5, tan δ=0.002. The graph demonstrates the wideband absorption capabilities of the transparent wideband microwave absorber unit cell 100, showing a reflection coefficient below-10 dB across the frequency range from 3.48 GHz to 13.02 GHz. This wide operating band confirms the fractional bandwidth of about 115.64% calculated from the ratio of the 9.54 GHz bandwidth to the 8.25 GHz center frequency.

The simulated reflection coefficient shown in FIG. 6A was obtained using Ansys electromagnetic simulation software with periodic boundary conditions and Floquet ports for the unit cell excitation. The reflection coefficient varied between approximately −10 dB and −15 dB across the operating band, with some frequencies exhibiting better absorption (more negative reflection coefficient) than others. This variation is due to the different resonant mechanisms contributing to the overall absorption at different frequencies, with some frequencies benefiting from stronger resonant effects than others. The simulation results confirm the effectiveness of the transparent wideband microwave absorber unit cell 100 in absorbing incident microwave energy across a wide frequency range while maintaining a thin profile and optical transparency.

Figure 6B:
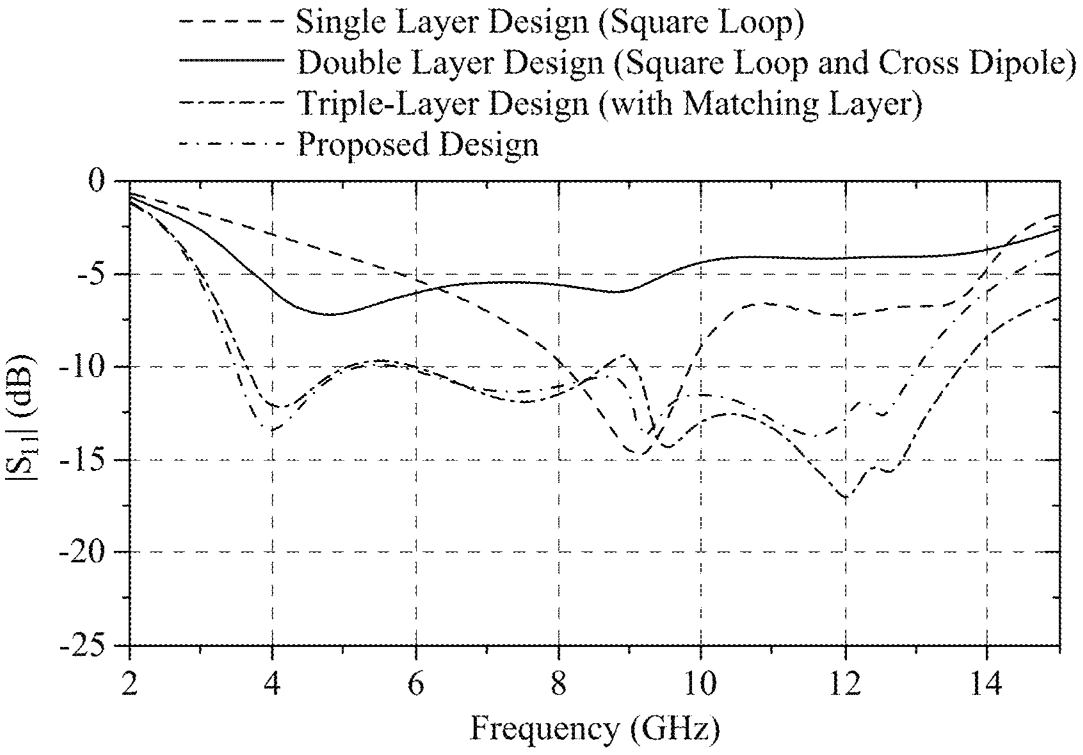
FIG. 6B is a graph for simulated reflection coefficient of the transparent wideband microwave absorber unit cell at each design stage, according to certain embodiments.

Referring to FIG. 6B, illustrated is a graph showing the simulated reflection coefficient of the transparent wideband microwave absorber unit cell 100 at each design stage of its development. The graph plots the reflection coefficient ($S_{11}$ parameter) in decibels (dB) against frequency in gigahertz (GHz) for several different configurations, representing the evolution of the design from a single-layer structure to the complete three-layer structure. As additional elements are added in subsequent design stages, more resonance dips appear in the reflection coefficient curve, and the overall absorption band widens. The final design stage, corresponding to the complete three-layer structure with all ITO patterns, shows a continuous absorption band from 3.48 GHz to 13.02 GHz, with the reflection coefficient maintained below-10 dB across this entire frequency range.

As may be understood from the graph of FIG. 6B, each design stage builds upon the previous one, adding new resonant mechanisms that extend the absorption capabilities to additional frequency bands. The initial design stage with a single resonance dip has a narrow operating band, suitable only for applications requiring absorption at a specific frequency. As additional design elements are incorporated, the operating band widens, creating a structure capable of absorbing electromagnetic waves across multiple frequency bands. The square loop and square patches on the first layer of glass 104 primarily contribute to absorption at the lower frequencies within the operating band, while the cross-shaped dipole on the second layer of glass 106 addresses the mid-range frequencies, and the circular patches on the third layer of glass 108 contribute to absorption at the higher frequencies. The combination of these resonant mechanisms creates a wideband absorber capable of operating across portions of the S-band, C-band, X-band, and Ku-band, making it suitable for various applications requiring protection against electromagnetic interference or radar detection across multiple frequency bands. The final design represents an optimal configuration that achieves the wideband absorption target while maintaining a low profile (0.077 $\lambda_{min}$) and optical transparency, addressing the key requirements for the intended applications.

Figure 6C:
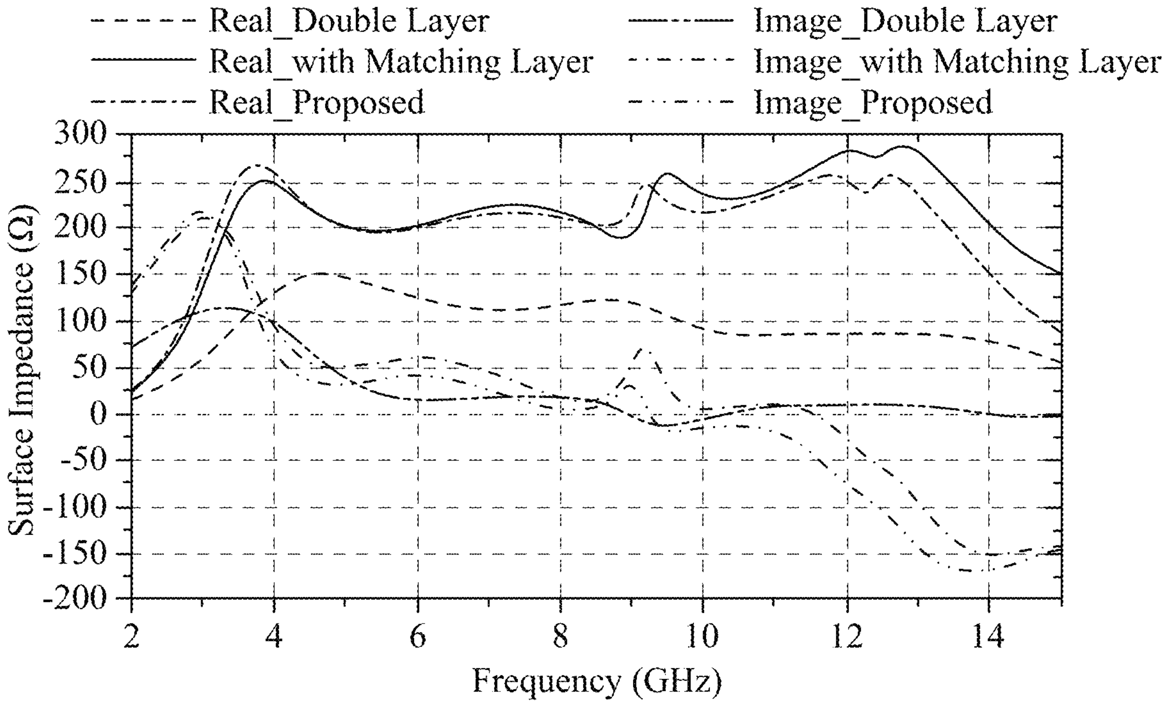
FIG. 6C is a graph for simulated surface impedance of the transparent wideband microwave absorber unit cell at each design stage, according to certain embodiments.
Figure 6D:
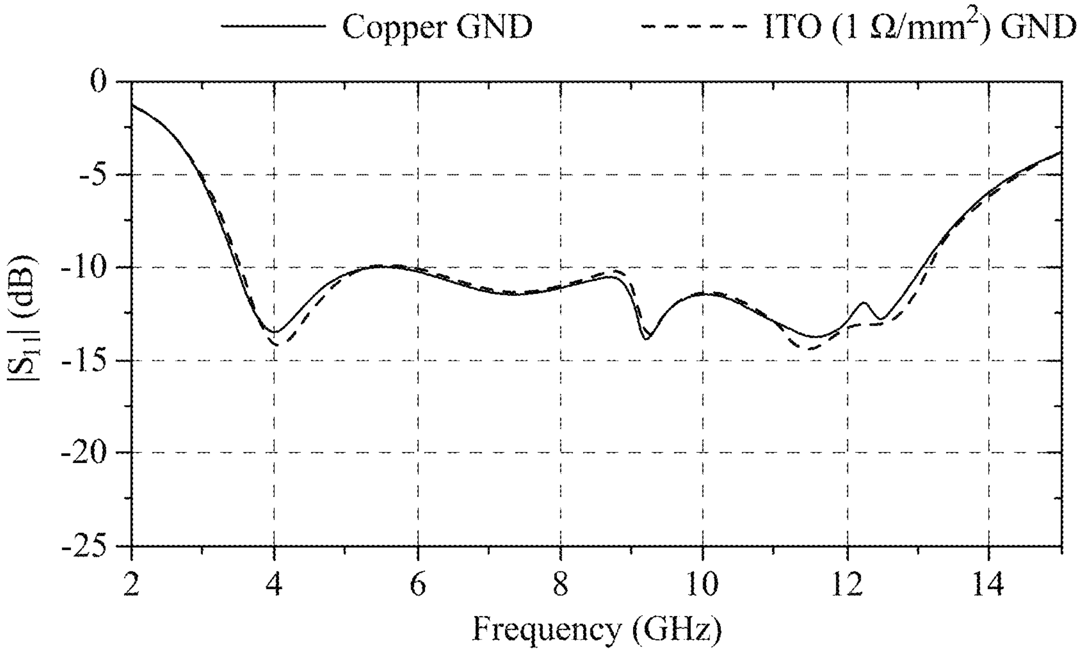
FIG. 6D is a graph showing a comparison between the performance of the transparent wideband microwave absorber unit cell using copper ground plane versus indium tin oxide ground plane, according to certain embodiments.

Referring to FIG. 6C, illustrated is a graph showing the simulated surface impedance of the transparent wideband microwave absorber unit cell 100 at each design stage of its development. The graph plots the real and imaginary parts of the surface impedance in ohms versus frequency in gigahertz (GHz) for several different configurations, corresponding to the design stages shown in FIG. 6B. The surface impedance is a key parameter in absorber design, as it determines how effectively the structure can match the impedance of free space (377 ohms) to minimize reflection and maximize absorption. The graph shows how the surface impedance evolves with each design stage, gradually approaching a configuration that provides effective impedance matching across the wide operating frequency band. The final design stage, corresponding to the complete three-layer structure with all ITO patterns, shows a surface impedance that provides the wideband absorption capabilities demonstrated in the graphs of FIG. 6A and FIG. 6B.

Referring to FIG. 6D, illustrated is a graph showing a comparison between the performance of the transparent wideband microwave absorber unit cell 100 using copper ground plane versus ITO ground plane with resistivity equalling 1 Ω/mm$^2$. The graph plots the reflection coefficient ($S_{11}$ parameter) in decibels (dB) against frequency in gigahertz (GHz) for both ground plane configurations. The solid line represents the performance with copper ground plane, while the dotted line represents the performance with ITO ground plane. As shown in the graph, both configurations exhibit very similar absorption characteristics across the operating frequency range from 2 GHz to 14 GHz, with the reflection coefficient maintained below −10 dB from approximately 3.48 GHz to 13.02 GHz in both cases. This demonstrates that while the copper ground plane was used in the primary implementation due to lower fabrication costs, an ITO ground plane with resistivity equals 1 Ω/mm$^2$ could be used instead to achieve a fully transparent structure with equivalent absorption performance. The similarity in performance between the two ground plane materials indicates the flexibility of the transparent wideband microwave absorber unit cell 100 design in accommodating different implementation requirements while maintaining the desired electromagnetic absorption properties.

Figure 7A:
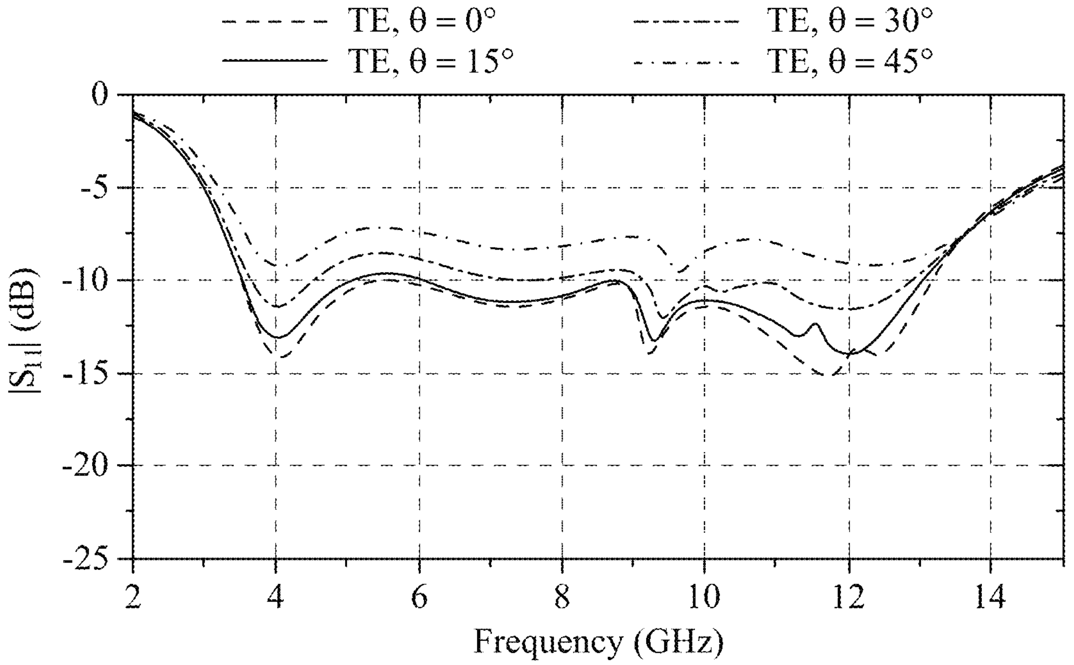
FIG. 7A is a graph for simulated performance of the transparent wideband microwave absorber unit cell under oblique incidence with TE polarization, according to certain embodiments.

Referring to FIG. 7A, illustrated is a graph showing the simulated performance of the transparent wideband microwave absorber unit cell 100 under oblique incidence with TE (transverse electric) polarization. The graph plots the reflection coefficient ($S_{11}$ parameter) in decibels (dB) against frequency in gigahertz (GHz) for different angles of incidence, including 0 degrees (normal incidence), 15 degrees, 30 degrees, and 45 degrees. As shown, the absorption performance remains relatively stable up to 30 degrees, with only minor variations in the reflection coefficient across the operating band. At 45 degrees, there is some degradation in performance, with the reflection coefficient rising above-10 dB at certain frequencies within the band, particularly at the upper end of the frequency range.

The stability up to 30 degrees indicates that the absorber can effectively handle electromagnetic waves arriving from different directions, within a reasonable angular range. This angular stability is particularly important for applications such as radar cross-section reduction, where electromagnetic waves may arrive from various directions. The performance degradation at 45 degrees, while expected for most absorber designs, is relatively modest, with the reflection coefficient remaining below −7 dB (corresponding to above 80% absorption) across most of the operating band. This level of absorption is still significant and may be sufficient for many applications.

Figure 7B:
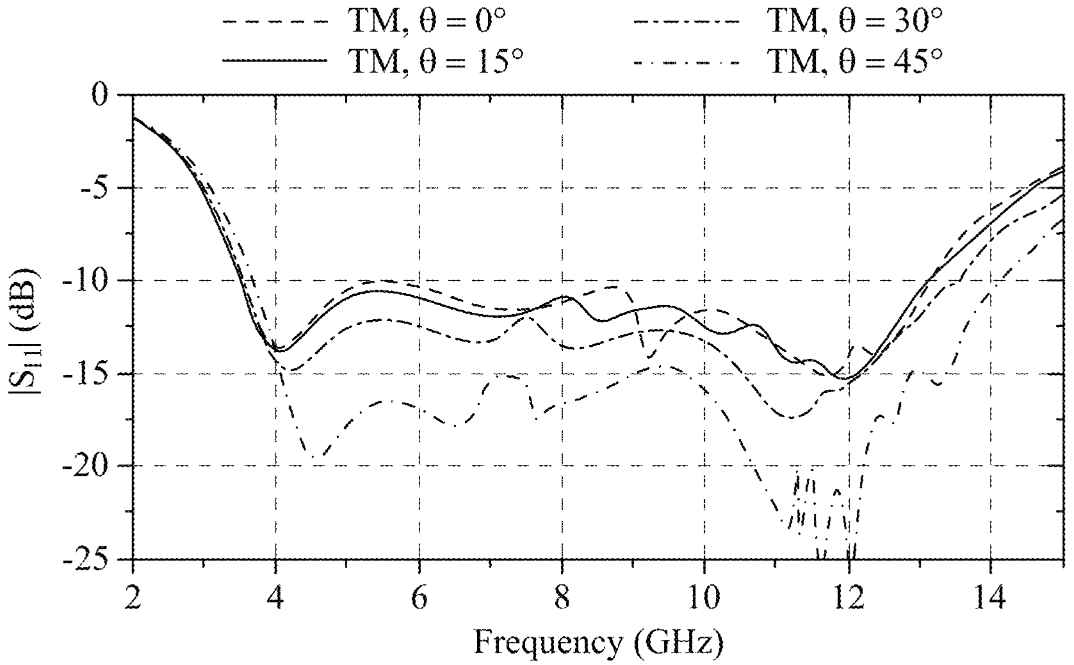
FIG. 7B is a graph for simulated performance of the transparent wideband microwave absorber unit cell under oblique incidence with TM polarization, according to certain embodiments.

Referring to FIG. 7B, illustrated is a graph showing the simulated performance of the transparent wideband microwave absorber unit cell 100 under oblique incidence with TM (transverse magnetic) polarization. The graph plots the reflection coefficient ($S_{11}$ parameter) in decibels (dB) against frequency in gigahertz (GHz) for different angles of incidence, including 0 degrees (normal incidence), 15 degrees, 30 degrees, and 45 degrees. The absorption performance under TM polarization shows greater stability with increasing angle of incidence than under TE polarization. Even at 45 degrees, the reflection coefficient remains below-10 dB across the majority of the operating band, indicating excellent absorption performance under oblique incidence with TM polarization. The absorption performance under TM polarization at oblique incidence enhances the practical utility of the transparent wideband microwave absorber unit cell 100, as it can effectively absorb electromagnetic waves arriving from various directions with different polarizations.

Figure 8:
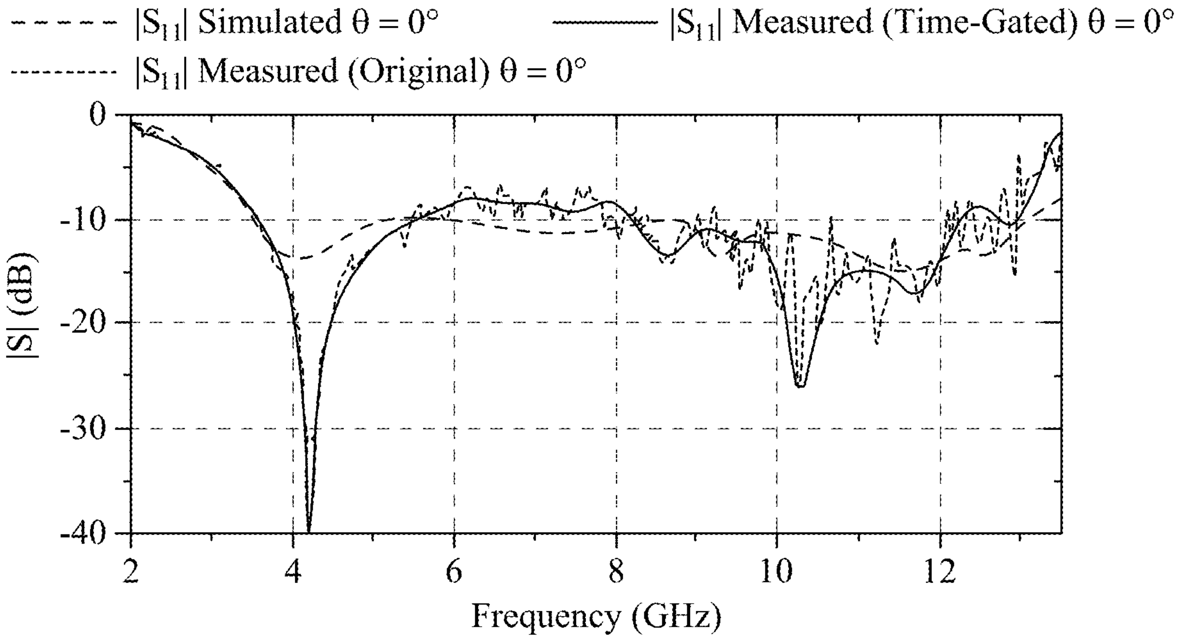
FIG. 8 is a graph for a comparison between simulated and measured reflection coefficients of the transparent wideband microwave absorber, according to certain embodiments.

Referring to FIG. 8, illustrated is a graph showing a comparison between the simulated and measured reflection coefficients of the transparent wideband microwave absorber 200. The graph plots the reflection coefficient ($S_{11}$ parameter) in decibels (dB) against frequency in gigahertz (GHz) for both the simulated performance and the measured performance of a fabricated prototype. The fabricated prototype consists of approximately 169 unit cells arranged in a 13×13 grid, creating an absorber panel with dimensions of about 200 mm×200 mm. The measurement was conducted using the free-space method at the rooftop of Building 59 at KFUPM, Saudi Arabia. Two sets of wideband standard-gain horn antennas are used in the measurement. Moreover, the measured reflection coefficient is collected under a three to six degree oblique incidence. The graph shows good agreement between the simulated and measured results, with the measured absorption closely following the simulated curve across the operating band from 3.48 GHz to 13.02 GHz. The validated performance of the transparent wideband microwave absorber 200 makes it suitable for various applications requiring both visual observation and wideband electromagnetic absorption, such as stealth windows, electromagnetic shielding, and electronic display protection.

The performance of the transparent wideband microwave absorber unit cell 100 was compared with several existing designs documented in the literature, including those presented in works by Jiang and coworkers [See: Jiang H and coworkers (2021) A conformal metamaterial-based optically transparent microwave absorber with high angular stability. *IEEE Antennas Wirel Propag Lett* 20 (8): 1399-1403], Song and coworkers [See: Song Z, Min P, Zhang R, Zhu J (2022) Optical transparent microwave absorber for high-quality imaging. *IEEE MTT-S International Wireless Symposium, IWS* 2022—Proceedings], Yang and coworkers [See: Yang J, Xiao L, Chen J (2020) A transparent broadband absorbing metamaterial based on ITO structure. *IEEE MTT-S International Microwave Workshop Series on Advanced Materials and Processes for RF and THz Applications*], Fu and coworkers [See: Fu C and coworkers (2023) RCS reduction on patterned graphene-based transparent flexible metasurface absorber. *IEEE Trans Antennas Propag* 71(2): 2005-2010], Lai and coworkers [See: Lai S and coworkers (2022) A high-performance ultra-broadband transparent absorber with a patterned ITO metasurface. *IEEE Photon J* 14(3): 4629107], Kumar and coworkers [See: Kumar A, Reddy G S, Jyotibhusan P (2022) Highly angular-stable optically transparent microwave absorber with wide absorption bandwidth. *IEEE Lett Electromagn Compat Pract Appl* 4(4): 114-119], Cheng and coworkers [See: Cheng Z, Qiang C, Jin Y and coworkers (2017) Broadband metamaterial for optical transparency and microwave absorption. *Appl Phys Lett*], Zhang and coworkers [See: Zhang L, Shi Y, Yang J X, Zhang X, Li L (2019) Broadband transparent absorber based on indium tin oxide-polyethylene terephthalate film. *IEEE Access* 7:137848-137855], and Deng and coworkers [See: Deng R and coworkers (2018) Theoretical analysis and design of ultrathin broadband optically transparent microwave metamaterial absorbers. *Materials* 11(1): 107]. The comparative analysis revealed several advantages of the present design in terms of bandwidth, profile thickness, and angular stability.

Table 1 below summarizes the performance characteristics of these various designs, highlighting the advantages of the transparent wideband microwave absorber unit cell 100. Table 1 compares key performance metrics including fractional bandwidth (FBW), relative permittivity ($\varepsilon_r$), thickness relative to minimum wavelength, and unit cell size relative to minimum wavelength.

TABLE 1

Comparison of transparent microwave absorber designs

| Ref | FBW (%) | $\varepsilon_r$ | Thickness/$\lambda_{min}$ | Unit cell size/$\lambda_{min}$ |
|---|---|---|---|---|
| Jiang and coworkers | 88.3 | 3.2 | 0.138 | 0.17 |
| Song and coworkers | 93.7 | 5.5 | 0.2 | — |
| Yang and coworkers | 102 | 3.75 | 0.087 | 0.20 |

TABLE 1-continued

Comparison of transparent microwave absorber designs

| Ref | FBW (%) | $\varepsilon_r$ | Thickness/$\lambda_{min}$ | Unit cell size/$\lambda_{min}$ |
|---|---|---|---|---|
| Fu and coworkers | 66.35 | 3 | 0.094 | 0.31 |
| Lai and coworkers | 58 | 3 | 0.1 | 0.86 |
| Kumar and coworkers | 91 | 2.1 | 0.117 | 0.22 |
| Cheng and coworkers | 112 | 5.5 | 0.089 | 0.27 |
| Zhang and coworkers | 118.1 | 2.25 | 0.218 | 0.17 |
| Deng and coworkers | 83 | 1 | 0.173 | 0.11 |
| Unit Cell 100 | 115.64 | 6 | 0.078 | 0.18 |

As shown in Table 1, the transparent wideband microwave absorber unit cell 100 of the present disclosure achieved a fractional bandwidth of 115.64% while maintaining a low profile of only 0.078 $\lambda_{min}$. This fractional bandwidth was comparable to that of the design by Zhang and coworkers, which reported a fractional bandwidth of 118.1%, but the present design achieved this with a significantly thinner profile (0.078 $\lambda_{min}$ compared to 0.218 $\lambda_{min}$). The design by Cheng and coworkers demonstrated a fractional bandwidth of 112% with a profile of 0.089 $\lambda_{min}$, but with a relative permittivity of 5.5 compared to 6 for the present design. The size of the unit cell 100 of the present design was 0.18 $\lambda_{min}$, which was comparable to or smaller than many of the reference designs, indicating efficient use of space while maintaining high performance.

The transparent wideband microwave absorber unit cell 100 provided an effective balance of wide bandwidth, low profile, and optical transparency. The use of glass with a high dielectric constant ($\varepsilon_r$=6) provided the development of a low-profile design with a thickness of only 0.078 $\lambda_{min}$, while the specific patterns of ITO on multiple layers created a structure that efficiently absorbed microwave energy across a wide frequency range. This combination of features made the transparent wideband microwave absorber unit cell 100 suitable for various applications requiring both visual observation and wideband electromagnetic absorption, such as stealth windows, electromagnetic shielding, and electronic display protection. The comparative analysis confirmed that the transparent wideband microwave absorber unit cell 100 represented an advancement in the field of transparent microwave absorbers, achieving one of the highest fractional bandwidths with one of the lowest profiles among the compared designs.

Figure 9A:
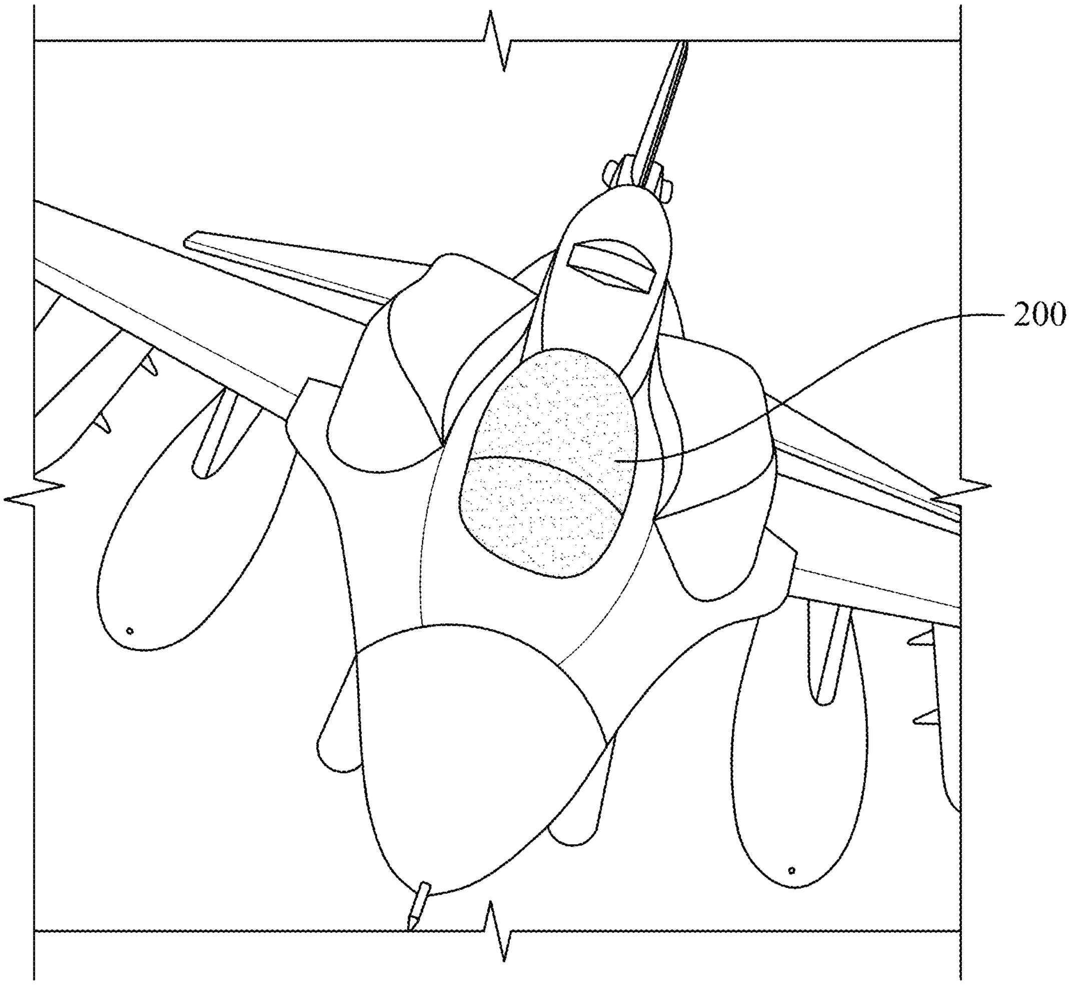
FIG. 9A is a depiction showing application of the transparent wideband microwave absorber in aircraft windows, according to certain embodiments.

Referring to FIG. 9A, illustrated is a depiction showing an application of the transparent wideband microwave absorber 200 in aircraft windows. The application utilizes the unique combination of optical transparency and wideband microwave absorption to create windows that permit visual observation while reducing the radar cross-section of the aircraft. The transparent wideband microwave absorber 200 is integrated into the window structure, with the metal substrate facing the interior of the aircraft and the glass layers facing the exterior. This configuration allows pilots and passengers to see outside the aircraft while preventing the transmission of radar signals through the windows, which would otherwise create a significant radar return and compromise the stealth characteristics of the aircraft.

Figure 9B:
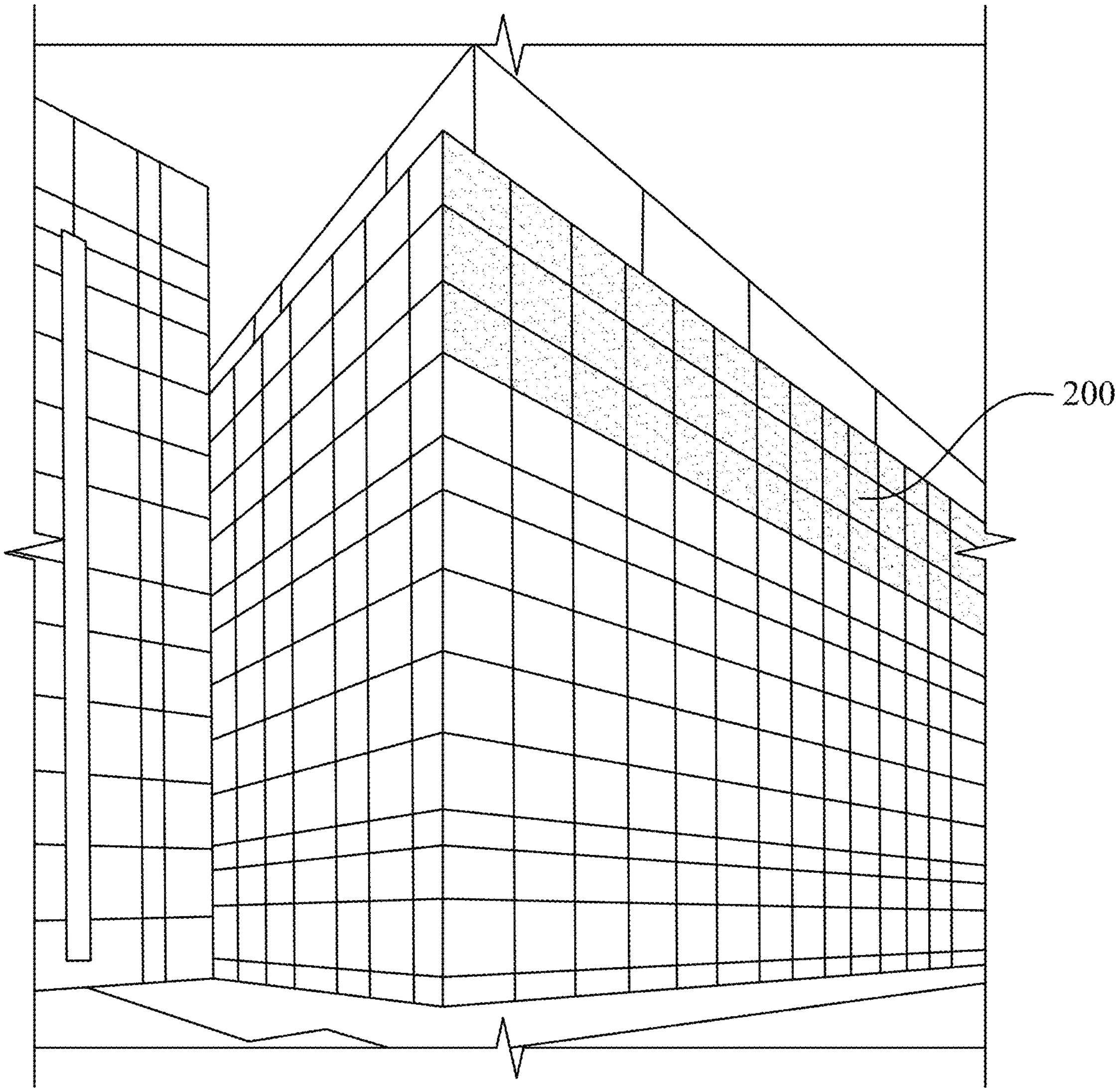
FIG. 9B is a depiction showing application of the transparent wideband microwave absorber in building windows for electromagnetic shielding, according to certain embodiments.

Referring to FIG. 9B, illustrated is a depiction showing an application of the transparent wideband microwave absorber 200 in building windows for electromagnetic shielding. The application uses the transparent wideband microwave absorber 200 to create windows that permit natural light to enter buildings while blocking or absorbing electromagnetic radiation from external sources. This electromagnetic shielding is valuable for sensitive facilities where protection against electronic eavesdropping or electromagnetic interference is required. The transparent wideband microwave absorber 200 is integrated into the window structure, with the metal substrate forming part of the window frame and the glass layers forming the visible portion of the window.

Figure 9C:
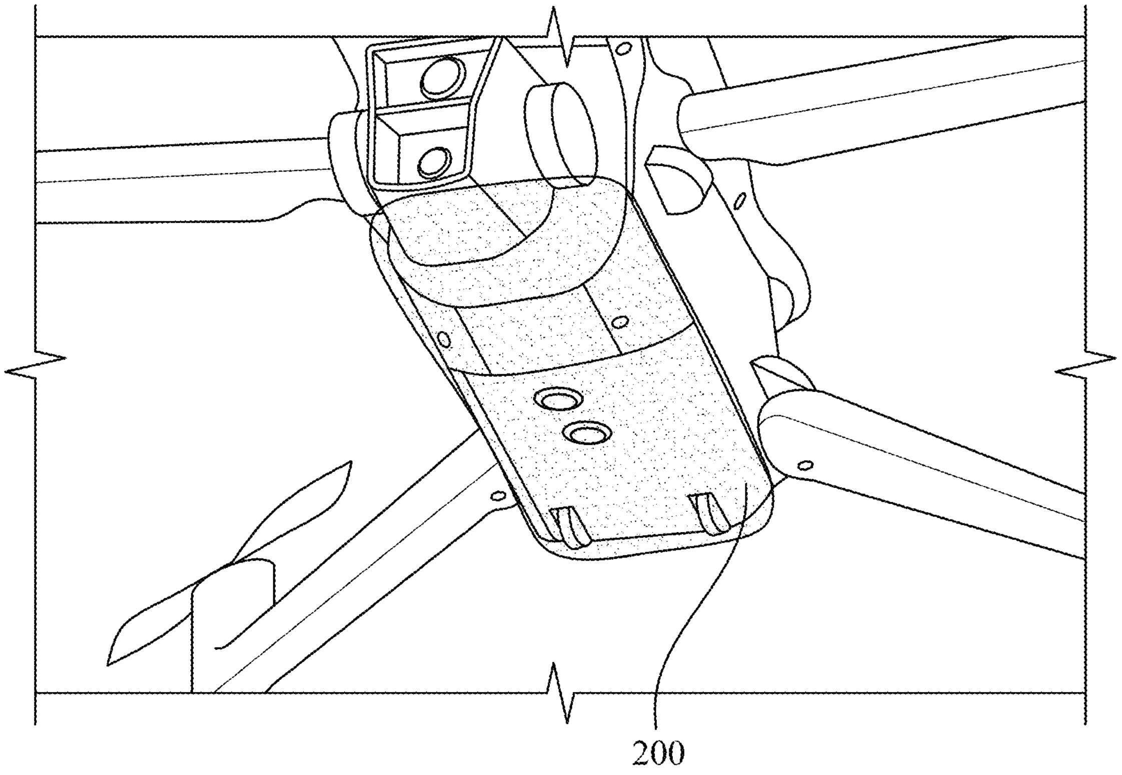
FIG. 9C is a depiction showing application of the transparent wideband microwave absorber in electronic components shielding, according to certain embodiments.

Referring to FIG. 9C, illustrated is a depiction showing an application of the transparent wideband microwave absorber 200 in electronic components (circuit) shielding. The application uses the transparent wideband microwave absorber 200 to create protective covers for electronic circuits and components that permit visual inspection while providing electromagnetic shielding. This combination of visual access and electromagnetic protection is valuable for applications where monitoring of electronic components is required while preventing electromagnetic interference or information leakage. The transparent wideband microwave absorber 200 is placed over the electronic circuit, with the metal substrate facing the circuit and the glass layers facing the observer.

Figure 9D:
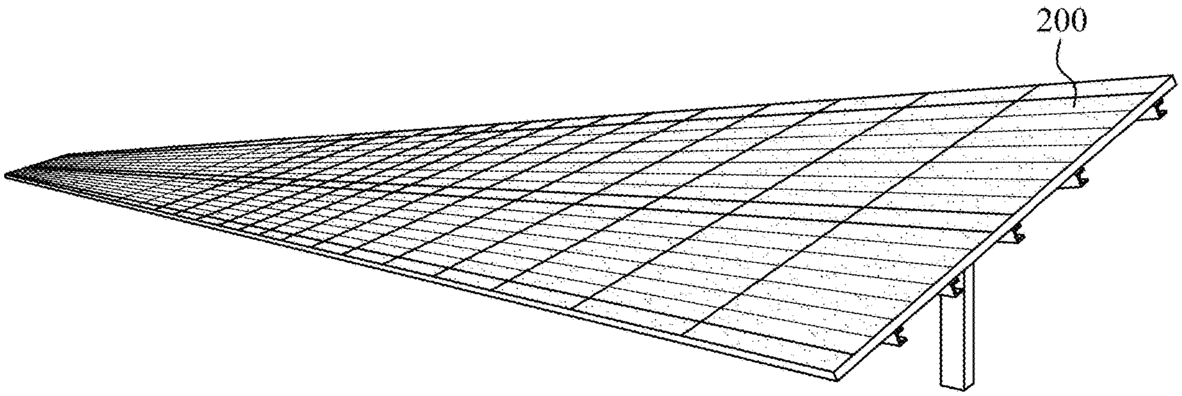
FIG. 9D is a depiction showing application of the transparent wideband microwave absorber as a solar panel cover, according to certain embodiments.

Referring to FIG. 9D, illustrated is a depiction showing an application of the transparent wideband microwave absorber 200 as a solar panel cover. The application uses the transparent wideband microwave absorber 200 to create a protective cover for solar panels that allows sunlight to reach the photovoltaic cells while providing electromagnetic shielding. This combination is valuable for applications where solar energy harvesting is required in environments with high levels of electromagnetic radiation or where electromagnetic emissions from the solar panel electronics may need to be contained. The transparent wideband microwave absorber 200 is placed over the solar panel, with the metal substrate facing the photovoltaic cells and the glass layers facing the sun.

Numerous modifications and variations of the present disclosure are possible in light of the above teachings. It is therefore to be understood that within the scope of the appended claims, the invention may be practiced otherwise than as specifically described herein.

The invention claimed is:

1. A transparent wideband microwave absorber unit cell, comprising:

a metal substrate;

a first layer of glass attached to the metal substrate, wherein the first layer of glass has a top surface configured with a first pattern of indium tin oxide (ITO) and a second pattern of ITO, wherein the first pattern is configured as a square loop centered about a central vertical axis of the transparent wideband microwave absorber unit cell and the second pattern includes four equidistant square patches, wherein the four equidistant square patches are evenly spaced on the top surface of the first layer of glass between the square loop and the central vertical axis;

a second layer of glass attached to the first layer of glass, wherein the second layer of glass includes a top surface having a third pattern of ITO, wherein the third pattern is configured as a dipole having a cross shape, wherein a center axis of the cross shape is coaxial with the central vertical axis; and a third layer of glass attached to the second layer of glass, wherein the third layer of glass includes a top surface having a fourth pattern of ITO, wherein the fourth pattern is configured as five circular patches, wherein a first circular patch is located coaxially with the central vertical axis and four equidistant circular patches are evenly spaced between the square loop and the central vertical axis, wherein the first layer of glass has a thickness of about 3.2 mm, the second layer of glass has a thickness of about 0.7 mm and the third layer of glass has a thickness of about 2.8 mm.

2. The transparent wideband microwave absorber unit cell of claim 1, wherein the unit cell is configured to resonate in a frequency band of about 3.48 GHz to about 13.02 GHz.

3. The transparent wideband microwave absorber unit cell of claim 2, wherein a fractional bandwidth of the unit cell is about 115.64%.

4. The transparent wideband microwave absorber unit cell of claim 2, wherein a structure thickness of the unit cell is given by 0.077 $\lambda_{min}$, where $\lambda_{min}$ is a free-space wavelength of about 3.48 GHz.

5. The transparent wideband microwave absorber unit cell of claim 1, wherein each layer of glass has a relative permittivity of about 5.5.

6. The transparent wideband microwave absorber unit cell of claim 1, wherein the metal substrate is indium tin phosphate configured to have a resistivity of about one ohm per square mm.

7. The transparent wideband microwave absorber unit cell of claim 1, wherein the metal substrate is made of copper and has a thickness of about 35 μm.

8. The transparent wideband microwave absorber unit cell of claim 1, wherein the square loop of the first pattern has an outer width of about 14 mm, an inner width of about 8.4 mm and a thickness of about 2.8 mm.

9. The transparent wideband microwave absorber unit cell of claim 1, wherein the four equidistant square patches each have a width of about 1.5 mm and are spaced from an inner edge of the square loop by about 0.9 mm.

10. The transparent wideband microwave absorber unit cell of claim 9, wherein:

the cross shape of the dipole of the third pattern has perpendicular arms of about 8 mm in length, wherein each arm has an end located about 3.5 mm from an outer edge of the second layer of glass, and each arm has a width of about 0.5 mm.

11. The transparent wideband microwave absorber unit cell of claim 10, wherein:

the four equidistant circular patches are spaced at a center-to-center distance of about 4.4 mm from each other, a center of each circular patch of the four equidistant circular patches is located about 5.6 mm from an outer edge of the third layer of glass, and each of the circular patches has a radius of about 1 mm.

12. The transparent wideband microwave absorber unit cell of claim 1, wherein:

a resistance of the first layer of glass configured with the first pattern of ITO and the second pattern of ITO is about 54 $\Omega/mm^2$;

a resistance of the second layer of glass configured with the third pattern of ITO is about 7 $\Omega/mm^2$; and a resistance of the third layer of glass configured with the fourth pattern of ITO is about 10 $\Omega/mm^2$.

13. The transparent wideband microwave absorber unit cell of claim 1, wherein an absolute value of an $S_{11}$ reflection coefficient is between about −10 dB to about −15 db at normal incidence of an impinging microwave beam.

14. A transparent wideband microwave absorber unit cell, comprising:

a metal substrate;

a first layer of glass attached to the metal substrate, wherein the first layer of glass has a top surface configured with a first pattern of indium tin oxide (ITO) and a second pattern of ITO, wherein the first pattern is configured as a square loop centered about a central vertical axis of the transparent wideband microwave absorber unit cell and the second pattern includes four equidistant square patches, wherein the four equidistant square patches are evenly spaced on the top surface of the first layer of glass between the square loop and the central vertical axis;

a second layer of glass attached to the first layer of glass, wherein the second layer of glass includes a top surface having a third pattern of ITO, wherein the third pattern is configured as a dipole having a cross shape, wherein a center axis of the cross shape is coaxial with the central vertical axis; and a third layer of glass attached to the second layer of glass, wherein the third layer of glass includes a top surface having a fourth pattern of ITO, wherein the fourth pattern is configured as five circular patches, wherein a first circular patch is located coaxially with the central vertical axis and four equidistant circular patches are evenly spaced between the square loop and the central vertical axis, wherein each etch pattern of ITO has a thickness of about 350 nm.

15. A transparent wideband microwave absorber, comprising:

a plurality of unit cells formed on a common metal substrate, wherein each unit cell includes:

a first layer of glass attached to the common metal substrate, wherein the first layer of glass has a top surface configured with a first pattern of indium tin oxide (ITO) and a second pattern of ITO, wherein the first pattern is configured as a square loop centered about a central vertical axis of the transparent wideband microwave absorber unit cell and the second pattern includes four equidistant square patches, wherein the four equidistant square patches are evenly spaced on the top surface of the first layer of glass between the square loop and the central vertical axis;

a second layer of glass attached to the first layer of glass, wherein the second layer of glass includes a top surface having a third pattern of ITO, wherein the third pattern is configured as a dipole having a cross shape, wherein a center axis of the cross shape is coaxial with the central vertical axis; and a third layer of glass attached to the second layer of glass, wherein the third layer of glass includes a top surface having a fourth pattern of ITO, wherein the fourth pattern is configured as five circular patches, wherein a first circular patch is located coaxially with the central vertical axis and four equidistant circular patches are evenly spaced between the square loop and the central vertical axis, wherein the plurality of unit cells is 169 unit cells; and the transparent wideband microwave absorber is configured as a square having sides of 200 mm×200 mm and a height of about 6.7 mm.

16. The transparent wideband microwave absorber of claim 15, wherein a fractional bandwidth is about 115.64% and a relative permittivity is about 6 in a frequency range of about 3.48 GHz to about 13.02 GHz.

* * * * *